United States Patent
Risch et al.

(10) Patent No.: US 10,782,496 B1
(45) Date of Patent: Sep. 22, 2020

(54) OPTICAL CABLES WITH LUBRICATED OPTICAL FIBERS AND METHODS OF FORMATION THEREOF

(71) Applicant: Prysmian S.p.A., Milan (IT)

(72) Inventors: Brian G. Risch, Granite Falls, NC (US); Gavin Lin, Lexington, SC (US)

(73) Assignee: Prysmian S.p.A., Milan (IT)

( * ) Notice: Subject to any disclaimer, the term of this patent is extended or adjusted under 35 U.S.C. 154(b) by 0 days.

(21) Appl. No.: 16/366,833

(22) Filed: Mar. 27, 2019

(51) Int. Cl.
*G02B 6/44* (2006.01)

(52) U.S. Cl.
CPC .......... *G02B 6/4429* (2013.01); *G02B 6/4479* (2013.01); *G02B 6/4494* (2013.01)

(58) Field of Classification Search
None
See application file for complete search history.

(56) References Cited

U.S. PATENT DOCUMENTS

| | | |
|---|---|---|
| 5,157,752 A | 10/1992 | Greveling et al. |
| 6,845,200 B1 | 1/2005 | Quinn |
| 7,970,247 B2 | 6/2011 | Barker |
| 8,265,442 B2 | 9/2012 | Overton |
| 9,188,754 B1 | 11/2015 | Risch et al. |
| 2007/0297730 A1 | 12/2007 | Bringuier et al. |
| 2010/0119202 A1 | 5/2010 | Overton |

FOREIGN PATENT DOCUMENTS

EP 2221647 A2 8/2010

OTHER PUBLICATIONS

Polywater FTTx "Quick-Drying Lubricant that Lowers Tension in Fiber Drops and Data Cable Pulls", Cable Pulling Lubricant, American Polywater Corporation, Apr. 2018, 2 pages.
Polywater FTTx, "Communications Lubricant", American Polywater Corporation, Apr. 2018, 4 pages.
ITU-T G.651.1, Telecommunication Standardization Sector of ITU, "Series G: Transmittion Systems and Networks", Transmission media and optical systems characteristics—Optical fibre cables, Jul. 2007, 15 pages.

*Primary Examiner* — Jerry Rahll
(74) *Attorney, Agent, or Firm* — Slater Matsil, LLP

(57) ABSTRACT

Embodiments of the present disclosure provide an apparatus and method for manufacturing of optical cable buffer tubes using an emulsion lubricant. In an embodiment, an optical cable includes a plurality of buffer tubes. Each buffer tube includes a bundle of optical fibers comprising an outer surface area, a swellable-thread comprising a hydrophilic base material comprising water, and a layer of silicone contacting at least a part of the outer surface area.

24 Claims, 16 Drawing Sheets

OPTICAL CABLES WITH LUBRICATED OPTICAL FIBERS AND METHODS OF FORMATION THEREOF

TECHNICAL FIELD

The present disclosure relates generally to optical cables, and, in particular embodiments, to optical cables with lubricated optical fibers and methods of formation thereof.

BACKGROUND

An optical fiber is a flexible and transparent fiber, used as a medium for transmitting light. An optical fiber has a small diameter and is typically comprised of a glass optical core, glass cladding, and a polymeric protective layer with overall diameter of about 250 microns or smaller. Optical fibers are typically bundled and encapsulated in a polymeric sheath, forming a buffer tube. Several buffer tubes are stranded around a central strength member and then jacketed in a common cable design. An optical cable is typically used to provide high speed, low loss, and high data rate information transmission over long distances. Optical cables are immune to electromagnetic interference and have found usage in a variety of industries, for example in medicine, flight, and telecommunications.

The buffer tubes can be filled with petroleum-based filling compounds to minimize friction and stress between the optical fibers and the surrounding polymeric sheath. The petroleum-based filling compound also effectively blocks water from migrating along the buffer tube, which prevents long-term damage to optical fibers. However, greasy filling compounds are messy and present handling inconveniences during manufacturing, installation, and access.

Dry-cable buffer tube designs exclude the filling compound and are more convenient for cable access, cable repair, and splicing, but suffer from static electric buildup. In addition, the optical fibers have a tendency to stick to the polymeric buffer tubes during and after the buffering extrusion process resulting in excess fiber length (EFL) control issues. Excess fiber length can also occur as a result of buffer tube shrinkage during processing and thereafter as post-extrusion shrinkage (PES). Too much excess fiber length can lead to undesirable attenuation in the optical cable.

Gel-free buffer tube designs typically include a non-greasy lubricant to reduce static and stiction. However, flow and leakage of the lubricant from the buffer tubes may occur during cable storage and installation.

SUMMARY

A first aspect relates to an optical cable that includes a plurality of buffer tubes, each buffer tube includes a bundle of optical fibers comprising an outer surface area, a swellable-thread comprising a hydrophilic base material comprising water, and a layer of silicone contacting at least a part of the outer surface area.

In a first implementation form of the optical cable according to the first aspect as such, the swellable-thread is disposed around one or more of the bundle of optical fibers.

In a second implementation form of the optical cable according to the first aspect as such or any preceding implementation form of the first aspect, the swellable-thread is interwoven with one or more of the bundle of optical fibers.

In a second implementation form of the optical cable according to the first aspect as such or any preceding implementation form of the first aspect, the bundle of optical fibers is disposed around the swellable-thread.

In a third implementation form of the optical cable according to the first aspect as such or any preceding implementation form of the first aspect, the optical cable also includes an outer jacket surrounding the plurality of buffer tubes and a central strength member. The plurality of buffer tubes disposed around the central strength member.

In a fourth implementation form of the optical cable according to the first aspect as such or any preceding implementation form of the first aspect, the swellable-thread is a tape, a yarn carrying a water-swellable material, or an ultraviolet cured swellable coating.

In a fifth implementation form of the optical cable according to the first aspect as such or any preceding implementation form of the first aspect, the layer of silicone includes water.

In a sixth implementation form of the optical cable according to the first aspect as such or any preceding implementation form of the first aspect a coating, inking, and emulsion system of the optical fibers is capable of withstanding a period of at least 90 days of water exposure or humidity conditioning testing at 60 degrees Celsius (0 C) with an increase in attenuation that is less than 0.1 decibel/kilometer (dB/km) at a wavelength of 1550 nanometer (nm).

In a seventh implementation form of the optical cable according to the first aspect as such or any preceding implementation form of the first aspect a coating, inking, and emulsion system of the optical fibers is capable of withstanding a period of at least 90 days of water exposure or humidity conditioning testing at 60 degrees Celsius (0 C) with an increase in attenuation that is less than 0.05 decibel/kilometer (dB/km) at a wavelength of 1550 nanometer (nm).

A second aspect relates to a method of manufacturing an optical cable, the method includes applying an emulsion lubricant to a bundle of optical fibers, the emulsion lubricant comprising silicone, water, and an emulsifying agent and adding a swellable-thread to absorb the water from the emulsion lubricant and leaving a layer of silicone between the bundle of optical fibers and the swellable-thread.

In a first implementation form of the method according to the second aspect as such, the swellable-thread is extruded around the bundle of optical fibers.

In a second implementation form of the method according to the second aspect as such or any preceding implementation form of the second aspect, the emulsifying agent includes a silicone surfactant, ionic surfactant, non-ionic surfactant, amphoteric surfactant, or a combination thereof.

In a third implementation form of the method according to the second aspect as such or any preceding implementation form of the second aspect, the emulsifying agent includes dimethicone copolyol, hydroxy terminated dimethicone copolyol, methoxy terminated dimethicone copolyol, Nonylphenol, or a combination thereof.

In a fourth implementation form of the method according to the second aspect as such or any preceding implementation form of the second aspect, the emulsion lubricant includes between about 90 percent and 99 percent water.

In a fifth implementation form of the method according to the second aspect as such or any preceding implementation form of the second aspect, the emulsion lubricant includes between about 1 percent and 9 percent silicone.

In a sixth implementation form of the method according to the second aspect as such or any preceding implementation form of the second aspect, the emulsion lubricant includes between about 0.001 percent and 1 percent emulsifying agent.

In a seventh implementation form of the method according to the second aspect as such or any preceding implementation form of the second aspect, the emulsion lubricant further includes a freezing point depressant.

In an eight implementation form of the method according to the second aspect as such or any preceding implementation form of the second aspect, the emulsion lubricant further includes a freezing point depressant chosen from the group consisting of glycol, glycerol, alcohol, or combinations thereof.

In a ninth implementation form of the method according to the second aspect as such or any preceding implementation form of the second aspect, the applying the emulsion lubricant includes forming, at an entry die, a plurality of optical fibers into the bundle of optical fibers; disposing, using a chamber, the emulsion lubricant onto the bundle of optical fibers; and removing, using an exit-die, excess emulsion lubricant from the bundle of optical fibers.

In a tenth implementation form of the method according to the second aspect as such or any preceding implementation form of the second aspect, the emulsion lubricant is applied to a surface of the bundle of optical fibers using a wiping die, a spray, or a misting process.

In an eleventh implementation form of the method according to the second aspect as such or any preceding implementation form of the second aspect, an application rate of the emulsion lubricant to the bundle of optical fibers is between about 8.8 grams/fiber kilometer (g/fkm) and 14.1 g/fkm.

A third aspect relates to a buffer tube, the buffer tube includes a bundle of optical fibers comprising an outer surface area, a swellable-thread comprising a hydrophilic base material comprising water, and a layer of silicone contacting at least a part of the outer surface area.

In a first implementation form of the buffer tube according to the third aspect as such, the layer of silicone is applied as an emulsion lubricant to the bundle of optical fibers, the emulsion lubricant comprising silicone, the water, and an emulsifying agent, the layer of silicone remaining on the outer surface area after the water is absorbed by the swellable-thread.

In a second implementation form of the buffer tube according to the third aspect as such or any preceding implementation form of the third aspect, the layer of silicone includes a silicone region having a thickness between about 0.5 nanometers (nm) and 5 nm.

BRIEF DESCRIPTION OF THE DRAWINGS

For a more complete understanding of the present disclosure, and the advantages thereof, reference is now made to the following descriptions taken in conjunction with the accompanying drawings, in which:

FIGS. 9A-B illustrate an embodiment optical cable, wherein FIG. 9A illustrates a cross-sectional view of the optical cable prior to compression and FIG. 9B illustrates a corresponding projection view;

FIGS. 10A-B illustrate another embodiment optical cable, wherein FIG. 10A illustrates a cross-sectional view of the optical cable prior to compression and FIG. 10B illustrates a corresponding projection view; and FIGS. 11A-B illustrate yet an embodiment optical cable, wherein FIG. 11A illustrates a cross-sectional view of the optical cable prior to compression and FIG. 11B illustrates a corresponding projection view.

DETAILED DESCRIPTION OF ILLUSTRATIVE EMBODIMENTS

Figure 1:
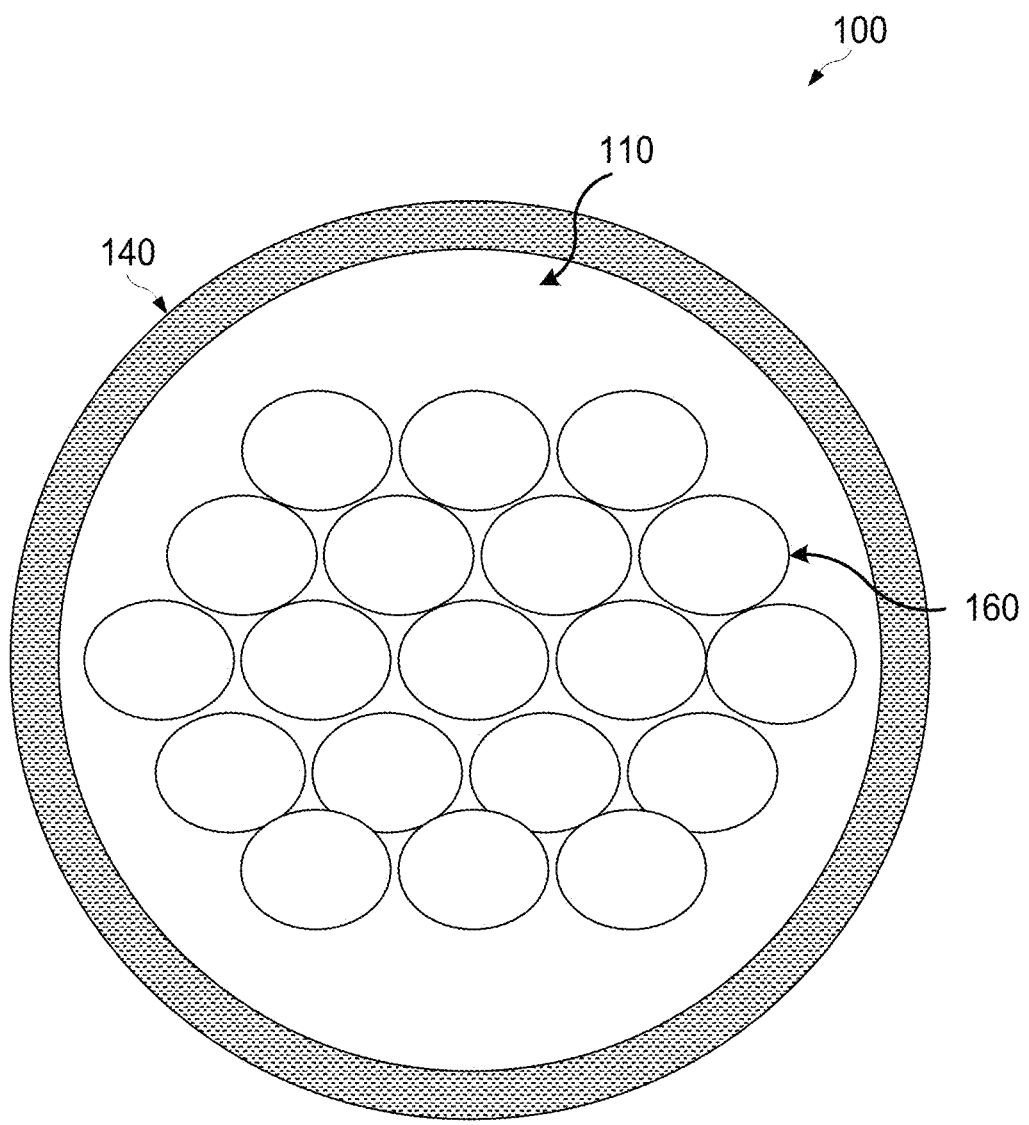
FIG. 1 illustrates a cross-sectional view of a buffer tube filled with a filling compound.

This disclosure provides many applicable inventive concepts that can be embodied in a wide variety of specific contexts. The specific embodiments are merely illustrative of specific configurations and do not limit the scope of the claimed embodiments. Features from different embodiments may be combined to form further embodiments unless noted otherwise. Variations or modifications described with respect to one of the embodiments may also be applicable to other embodiments. Further, it should be understood that various changes, substitutions, and alterations can be made herein without departing from the spirit and scope of this disclosure as defined by the appended claims.

In the present disclosure, various elements or components, described with reference to one figure, are denoted by the same reference in any subsequent figure. The description of such previously described elements will not be repeated as to not overburden the reader. Additionally, the figures are schematic representations and are not necessarily drawn to scale.

This disclosure relates to the application of an emulsion lubricant during the manufacturing of a gel-free buffer tube. The emulsion lubricant is mostly composed of water and smaller amounts of silicone and traces of emulsifying agent. The emulsion lubricant contains between about 90 percent to about 99 percent water, less than about 10 percent silicone, and less than 1 percent of emulsifying agent. In an example embodiment, the percentage of water is about 95 percent to about 99 percent, and the percentage of silicone is less than about 5 percent. A freezing point depressant may be added to the emulsion to prevent the emulsion from freezing at low temperatures. Examples of freezing point depressants are ethylene glycol, propylene glycol, some other alcohol, or some other water-soluble compound or mixture that depresses the freezing point of the emulsion when put into solution with the water component. If the freezing point depressant is added, a reduction of the water in the formulation is adjusted accordingly. Non-electrolytic freezing point depressants are preferred to prevent antagonistic action with the superabsorbent materials within the buffer tube.

In an embodiment, a controlled amount of emulsion lubricant is applied to the surface of one or more optical fibers prior to applying the swellable-thread and prior to extruding the polymeric sheath around the pre-wet optical fibers and water swellable-thread. The emulsion lubricant can be selectively applied using, for example, a wiping die or a misting spray process in a pre-wet or misting chamber.

In some embodiments, the entrance to the chamber may be tapered. In some embodiments, the exit point of the chamber may have a designed land length that advantageously controls the amount of emulsion lubricant applied to the optical fibers.

The application rate of the emulsion lubricant applied to a single optical fiber may range from about 5 grams per fiber kilometer (g/fkm) to about 15 g/fkm.

In one embodiment, a molten polymeric sheath surrounding a water-swellable material (e.g., swellable-thread) is then extruded around the pre-wet optical fibers to form a loose buffer tube. After the swellable-thread surrounds the pre-wet optical fibers, the ions in the swellable-thread absorb the water of the emulsion lubricant, leaving a thin layer of silicone between the bundle of optical fibers and the swellable-thread/polymeric sheath—the absorption of the water is a fairly quick interaction. The remaining silicone layer provides mechanical coupling and reduces stiction and buildup of static charges without the drippage observed in conventional gel-free buffer-tubes. As will be understood, the remaining silicone layer comprises some water in small amounts.

In another embodiment, the optical fibers are coated with an ultraviolet (UV) cured swellable coating that absorbs the water from the emulsion lubricant on the pre-wet optical fiber.

Aspects of disclosure provide a buffer tube design where an optical fiber is coated with a thin layer of silicone that advantageously reduces stiction and prevents the buildup of static electric charges during cable access, cable repair, and splicing. In one embodiment, the entirety of the water is absorbed by the swellable-thread and no lubricant flow is observed. Furthermore, the amount of silicone used in embodiments of this disclosure is substantially less than that used in prior art gel-free loose tube designs containing more typical silicone lubricants. Thus, providing a low-cost and environmental friendly solution for the manufacturing of optical cable buffer tubes. The emulsion is also typically far easier to remove from the fibers than traditional silicones due to the inclusion of the emulsifying agent. These and other aspects are discussed in greater detail below.

FIG. 1 illustrates a cross-sectional view of a conventional buffer tube 100. The buffer tube 100 includes a polymeric sheath 140 surrounding optical fibers 160 and filled with a filling compound 110. For purposes of clarity and consistency, the term "buffer tube," as used herein, generally refers to the combination of the optical fibers 160 and the surrounding polymeric sheath 140.

The filling compound 110 is a petroleum-based filling compound (e.g., grease or grease-like gels). The filling compound 110, being a thixotropic material, mechanically couples the optical fibers 160 to the polymeric sheath 140. This prevents the optical fibers 160 from retracting inside the buffer tube 100 as the buffer tube 100 is processed during, for example, manufacturing (e.g., as the cable is installed or otherwise handled in the field) or subjected to thermally induced dimensional changes from environmental exposure. The filling compound 110 also prevents the ingress of water into the buffer tube 100.

A substantial disadvantage of the filling compound 110 is the added inconvenience present during cable access, cable repair, and optical fiber splicing, in addition to its higher cost. Thixotropic filling greases are relatively heavy and messy, and thus hinder connection and splicing operations. The presence of the filling compound 110 requires cleaning the petroleum-based material from the optical fibers 160 prior to splicing—and occasionally from equipment and handling personal. This is a messy and time-consuming operation. Consequently, using conventional filling grease is undesirable.

Figure 2:
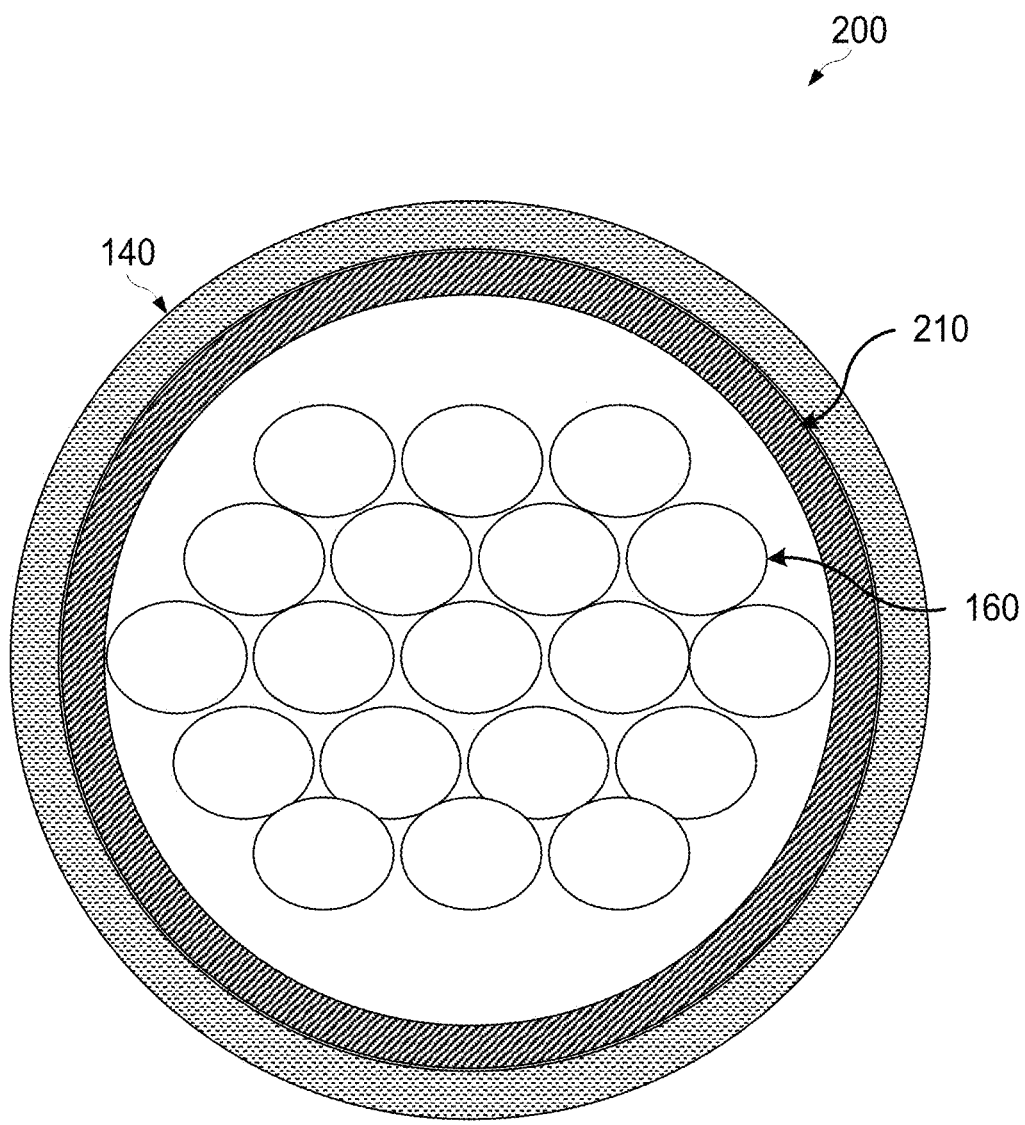
FIG. 2 illustrates a cross-sectional view of a dry-cable buffer tube.

FIG. 2 illustrates a cross-sectional view of a conventional dry-cable or loose-tube design buffer tube 200. The buffer tube 200 includes a water-blocking element 210 positioned within the polymeric sheath 140. The water-blocking element 210, in the form of a water-swellable powder, can bound to a carrier tape or yarn, and can be readily removed during field operations (e.g., splicing).

Dry-cable designs eliminate the need for the filling compound (e.g., grease) while providing mechanical coupling and water-blocking functionalities. Generally, a dry-cable buffer tube is substantially free from thixotropic compositions (e.g., grease or grease-like gels), however, a totally dry design may eliminate the filling compound 110 from within the buffer tube altogether.

A substantial disadvantage of the dry-cable design is that the optical fibers 160 build up a charge of static electricity during processing, which cause the optical fibers 160 to repel one another. In this scenario, for example during extrusion, the optical fibers 160 will be forced into and likely stick to the molten inner wall of the polymeric sheath 140. The sticking results in elevated optical fiber attenuation and may persist until the buffer tube 200 is opened for purposes of accessing the optical fibers 160. The buildup of the static charge increases the difficulty of capturing optical fibers for splicing, connecting, or ribbonizing.

Another significant disadvantage of the dry-cable design is that after formation of the extruded buffer tube 200 around the optical fibers 160, the optical fibers 160 tend to stick to the inner surface of the solidified buffer tube 200. The stiction (i.e., force required to cause the optical fibers 160 to move when in contact with the polymeric sheath 140) results in increased and/or highly variable excess fiber length (EFL) during manufacturing. Moreover, the stiction could have a negative impact to the operation of the clincher, which is an EFL controlling device that may be used in a loose tube buffering process. The stiction phenomenon can be the result of a static electricity, as well as simple contact and surface forces between the optical fiber 160 and the surrounding polymeric sheath 140. Consequently, dry-cable designs offer added challenges for buffer tube manufacturing.

Figure 3:
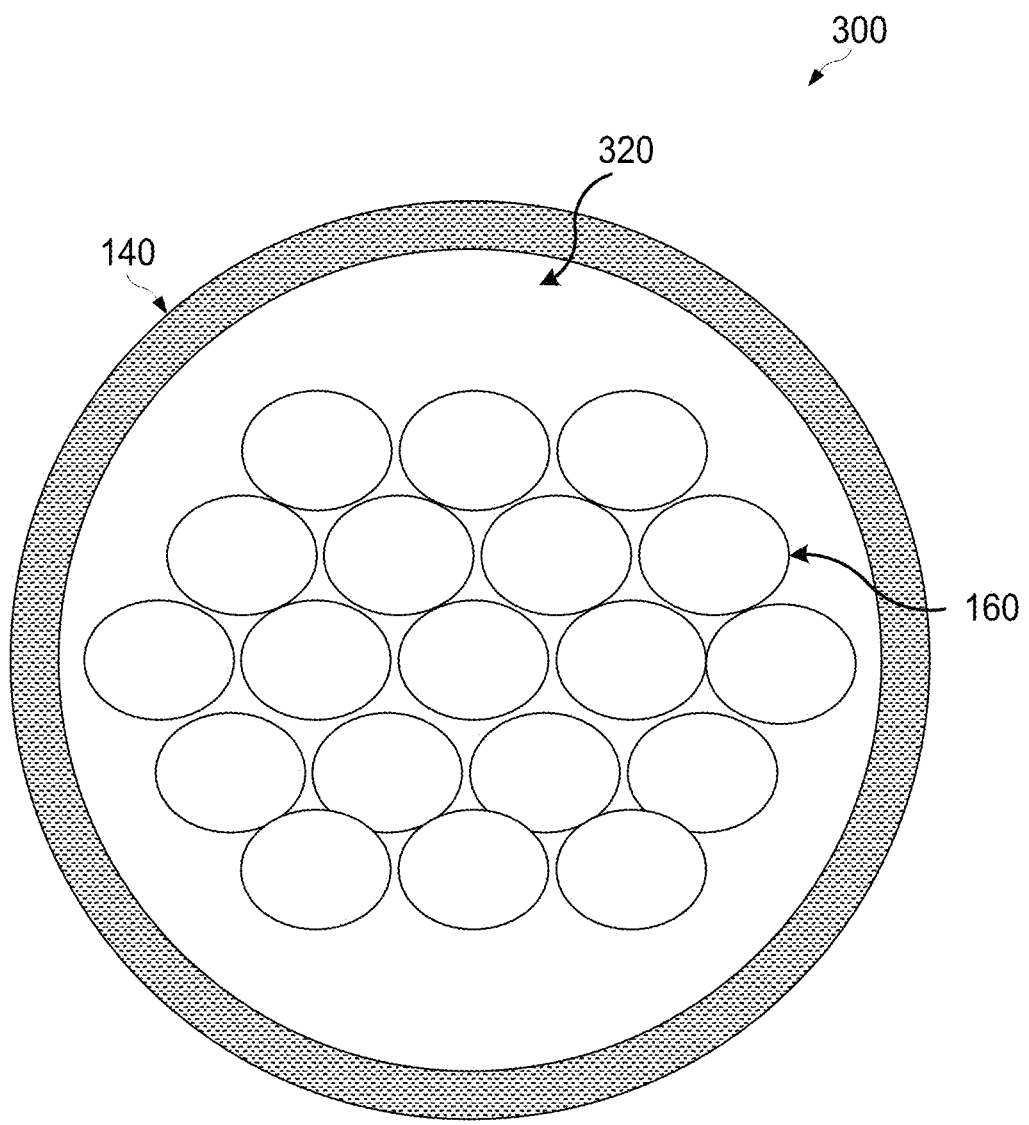
FIG. 3 illustrates a cross-sectional view of a gel-free buffer tube.

FIG. 3 illustrates a cross-sectional view of a conventional gel-free buffer tube 300. In a gel-free buffer tube design, an alternative to the filing compound and dry-cable design, the buffer tube 300 includes a gel-free lubricant/fluid 320. The fluid 320 provides lubrication and static elimination during processing. Unlike in gel-filled tubes, the lubricant layer accounts for a small fraction of the gap between the fiber bundle and the buffer tube. Increased interfacial interaction and adhesion between the fluid 320 and the optical fiber's outermost coating (e.g., a secondary coating or, if present, an ink layer) may help to retain the fluid 320 on the optical fiber 160 during manufacturing, storage, and installation of the buffer tube 300. Selective application of the fluid 320 reduces stiction between the optical fiber 160 and the surrounding polymeric sheath 140 (e.g., during manufacturing, storage, and/or installation). The interfacial interaction, however, may sometimes have limitations on flow reduction on the fluid.

The fluid 320 also reduces and overcomes the static electrical charge and provides mechanical coupling by holding the optical fibers 160 in an easily manageable stack or bundle. The fluid 320 also prevents the optical fibers 160 from sticking to the wall of the buffer tube 300 during extrusion, allowing the excess fiber length to be reduced and controlled to acceptable and precise levels. Additionally, the lubricant or fluid allows for proper ratio of optical fiber 160 to buffer tube 300 length.

A disadvantage in existing gel-free buffer-tubes is that normal lubricating oils, within the desired viscosity range, tend to flow out of the buffer tube 300 when the buffer tube 300 (e.g., as incorporated into a cable) is positioned, for example, in a vertical orientation. Likewise, conventional lubricants pool in the buffer tube 300 when stored on a reel (e.g., a wound cable that includes a multitude of loose buffer tubes). An increase in the fluid viscosity (i.e., viscosity pertains to the relationship between force and the rate of flow) may reduce the rate of lubricant flow but does not prevent the flow of the fluid and the increase in viscosity may cause undesirable effects such as yield stress to the optical cable as high viscosity tends to retard wetting and spreading. Embodiments of this disclosure provide a solution to fluid flow within a gel-free buffer tube design.

Figure 4A:
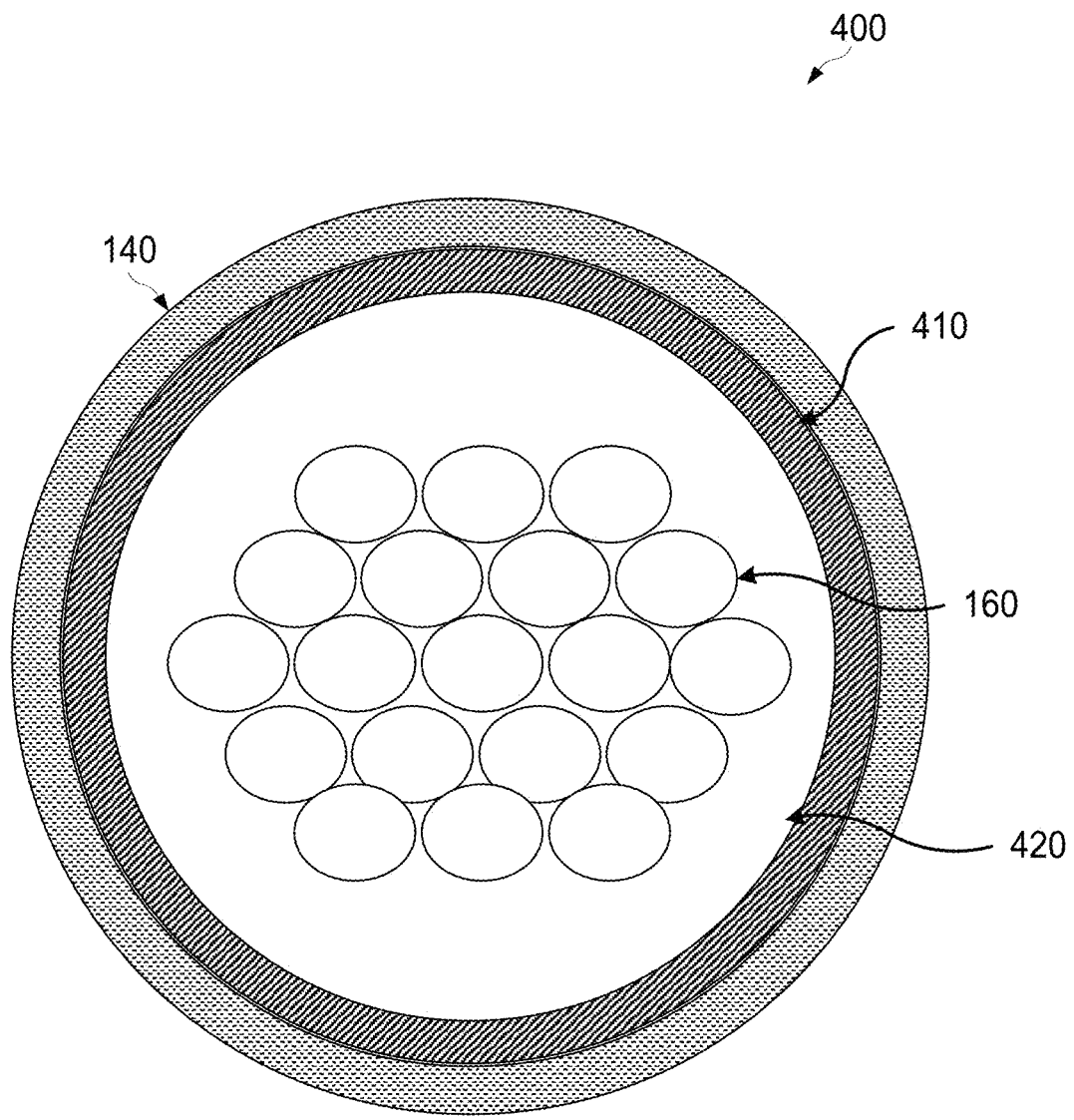
FIGS. 4A-D illustrate a cross-sectional view of embodiment buffer tubes manufactured using a silicone based emulsion process.

FIGS. 4A-D illustrate cross-sectional views of various embodiments of a buffer tube fabricated using an emulsion lubricant. FIG. 4A illustrates a cross-sectional view of an embodiment buffer tube 400 having a swellable-thread 410 and fabricated using an emulsion lubricant. The emulsion lubricant is applied to the surface of the optical fibers 160 prior to the polymeric sheath 140 and the swellable-thread 410 extruding around the optical fibers 160. After the swellable-thread 410 surrounds the optical fibers 160, the ions in the swellable-thread 410 absorb the water of the emulsion lubricant, leaving a thin layer of silicone 420 between the optical fibers 160 and the swellable-thread 410/polymeric sheath 140—the absorption of the water is a fairly quick interaction.

Silicone molecules, for example, forming a monolayer of silicone, coated over the bundle of optical fibers may be sufficient to increase the lubricity of the fibers. However, multiple layers of silicone coated over the optical fibers may also be contemplated. The remaining thin layer of silicone 420 provides mechanical lubrication and reduces stiction and buildup of static charges without the drippage observed in conventional gel-free buffer-tubes, for example in the buffer tube 300 discussed above.

It should be noted that the embodiment of FIG. 4 does not affect any functional aspect of the buffer tube 400 or of the optical cable during operation. It advantageously improves the cleaning of the optical fibers 160 during splicing and provides for an easier fiber optic access.

Advantageously, the thin layer of silicone 420 on the surface of the optical fibers 160 is much thinner than that of the filling compound or lubricant in the previous embodiments, resulting in less silicone to be used in the manufacturing of the buffer tube 400. Furthermore, as water provides the majority of the emulsion lubricant, the emulsion lubricant provides a low cost and environmentally friendly alternative to the conventional petroleum based filling compounds and lubricants.

The emulsion lubricant contains between about 90 percent to about 99 percent water, less than about 10 percent silicone, and less than 1 percent of emulsifying agent. In a preferred embodiment, the percentage of water is about 95 percent to about 99 percent, and the percentage of silicone is less than about 5 percent.

In an example embodiment, the silicone emulsion may be a compound similar to Armor All™, which is used as a gloss enhancer and protectant for plastics. Antioxidants can be included in this type of formulation to provide protection to the plastic or rubber. In another example embodiment, the silicone-based emulsion may be polywater FFTx, which is commercially available.

In another example embodiment, the silicone may be polydimethylsiloxane with a viscosity of 50 cP and corresponding to a chemical abstracts service (CAS) No. 63148-62-9. A polydimethylsiloxane having a modified polymeric chain backbone may also be used. The polydimethylsiloxane is typically modified with functional groups including alkyl, polyglycol, polyether, amino, halogenated groups, or other such functional groups, to modify affinity, wetting, and interfacial-adhesion properties (e.g., with respect to optical-fiber coatings).

In yet another example embodiment, the silicone may be a functionalized silicone, such as Lurol 13754, a textile-yarn spin finish with an improved adhesion tension to optical fiber coating that is made available from Goulston Technologies, Inc. (Monroe, N.C.). Lurol 13754 is chemically functionalized, which slightly alters the surface tension and adhesive tension values from a standard polydimethylsiloxane fluid.

In another example embodiment, the emulsion lubricant may be SP9650 from Momentive Performance Materials or Rhodorsil Fluid 47V50 from BlueStar Silicones.

Generally, the viscosity of the silicone may range from about 5 centipoise (cP)/millipascal seconds (mPa·s) to about 500 cP. In one embodiment, the viscosity of the silicone may range from about 10 cP to about 100 cP.

In an embodiment, the emulsifying agent is a silicone surfactant, such as dimethicone copolyol, hydroxy terminated dimethicone copolyol, methoxy terminated dimethicone copolyol, or Nonylphenol. In other embodiments, the emulsifying agent is an ionic, a non-ionic surfactant, an amphoteric surfactant, or a combination (i.e., mixture) thereof.

Figure 4B:
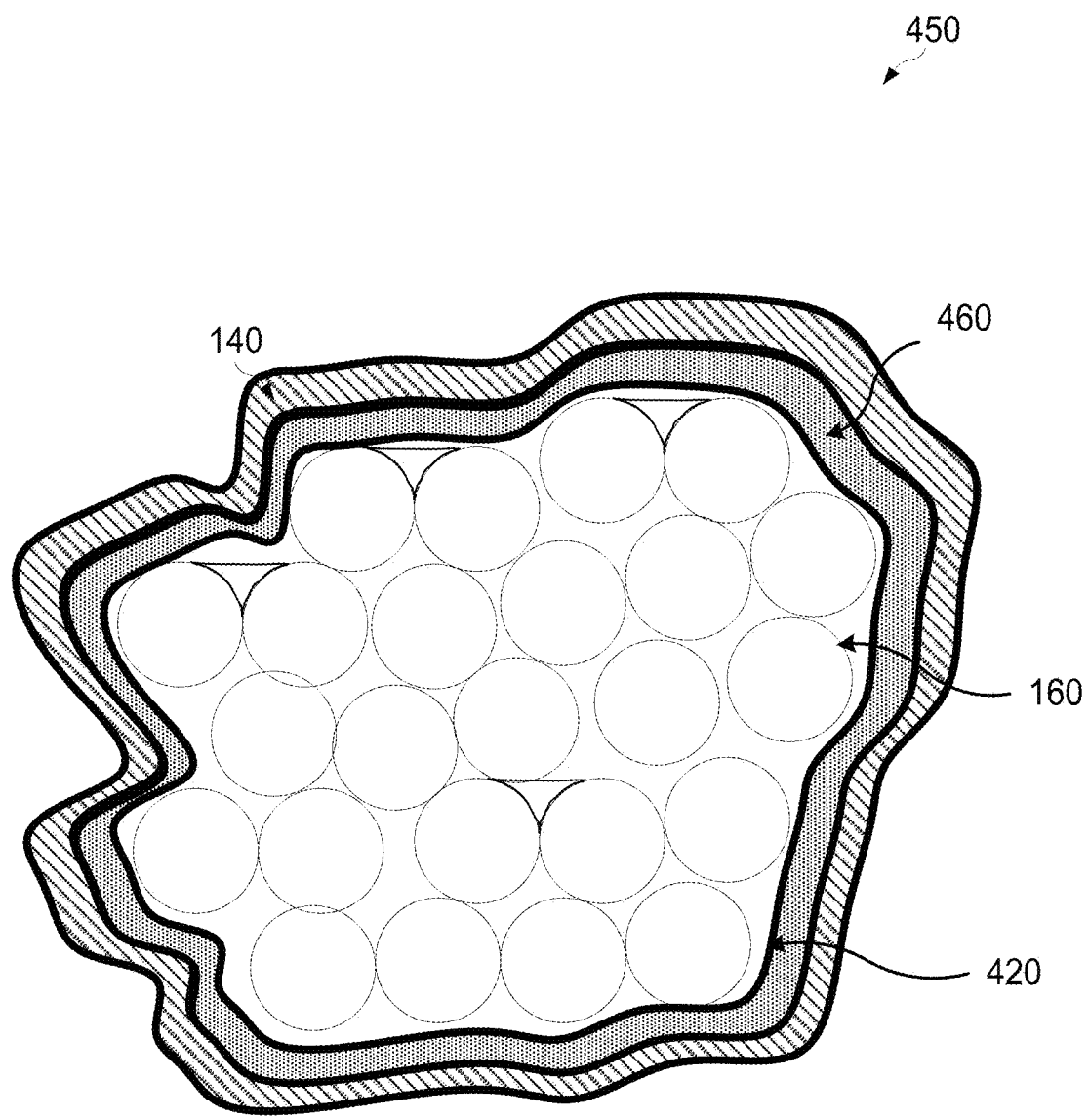

In a non-limiting example, the optical fibers 160 may be loosely placed in the buffer tube 400. Because the optical fibers 160 typically bunch together within the buffer tube 400, the optical fibers 160 are depicted in FIG. 4A-B as centrally located bundles within the buffer tube 400. However, other arrangements are contemplated.

The swellable-thread 410 is positioned within the polymeric sheath 140 and is a superabsorbent material capable of absorbing water. In an embodiment, the swellable-thread 410 may be a tape or a yarn carrying a water-swellable material (e.g., water-swellable powder). The swellable-thread 410 is dry to the touch and may be helically wrapped around the optical fibers 160 before the polymeric sheath 140 is extruded around the optical fibers 160 within the buffer tube's annular space. Alternatively, the swellable-thread 410 may be a water-swellable yarn (e.g., a thread-sized water-blocking element) positioned longitudinally (e.g., adjacent to the pre-wet optical fibers) within the buffer tube's annular space.

In an embodiment, the polymeric sheath 140 is made from polyolefin (e.g., nucleated or non-nucleated polyethylene, nucleated polypropylene, or a copolymer or blend thereof), polyester (e.g., polybutylene terephthalate), a polyamide (e.g., nylon), or a flame retardant composition, such as a low-smoke, zero-halogen (LSZH) compound, a flame retardant polyvinyl chloride (PVC), or a polyvinylidene difluoride (PVDF) copolymer.

The polymeric sheath 140 may be formed of one or more layers. The layers may be homogeneous or include mixtures or blends of various materials within each layer. The polymeric sheath may be extruded (e.g., an extruded polymeric material). As an example, the polymeric sheath may include a material to provide high temperature and chemical resistance (e.g., an aromatic material or polysulfone material).

FIG. 4B illustrates a cross-sectional view of an embodiment buffer tube 450 having a ultraviolet (UV) cured swellable coating 460 over the bundle of optical cables and fabricated using an emulsion lubricant. Although buffer tubes typically have a circular cross section (e.g., buffer tube 400), buffer tubes alternatively may have an irregular or non-circular shape (e.g., an oval or a trapezoidal cross-section). Buffer tube 450 illustrates a buffer tube having an irregular or non-circular shape.

Unlike the buffer tube 400, which has a swellable-thread 410, the buffer tube 450 has a UV cured swellable coating 460. The UV cured swellable coating 460 is applied to the optical fibers 160 prior to the buffering process. The UV cured swellable coating 460, similar to the swellable-thread 410, absorbs the water in the emulsion lubricant.

To the extent that non-circular buffer tubes are used, the longest inner cross-sectional width of the buffer tube 450 can be used to define the diameter of a theoretical circularized buffer tube cross-sectional area.

Figure 4C:
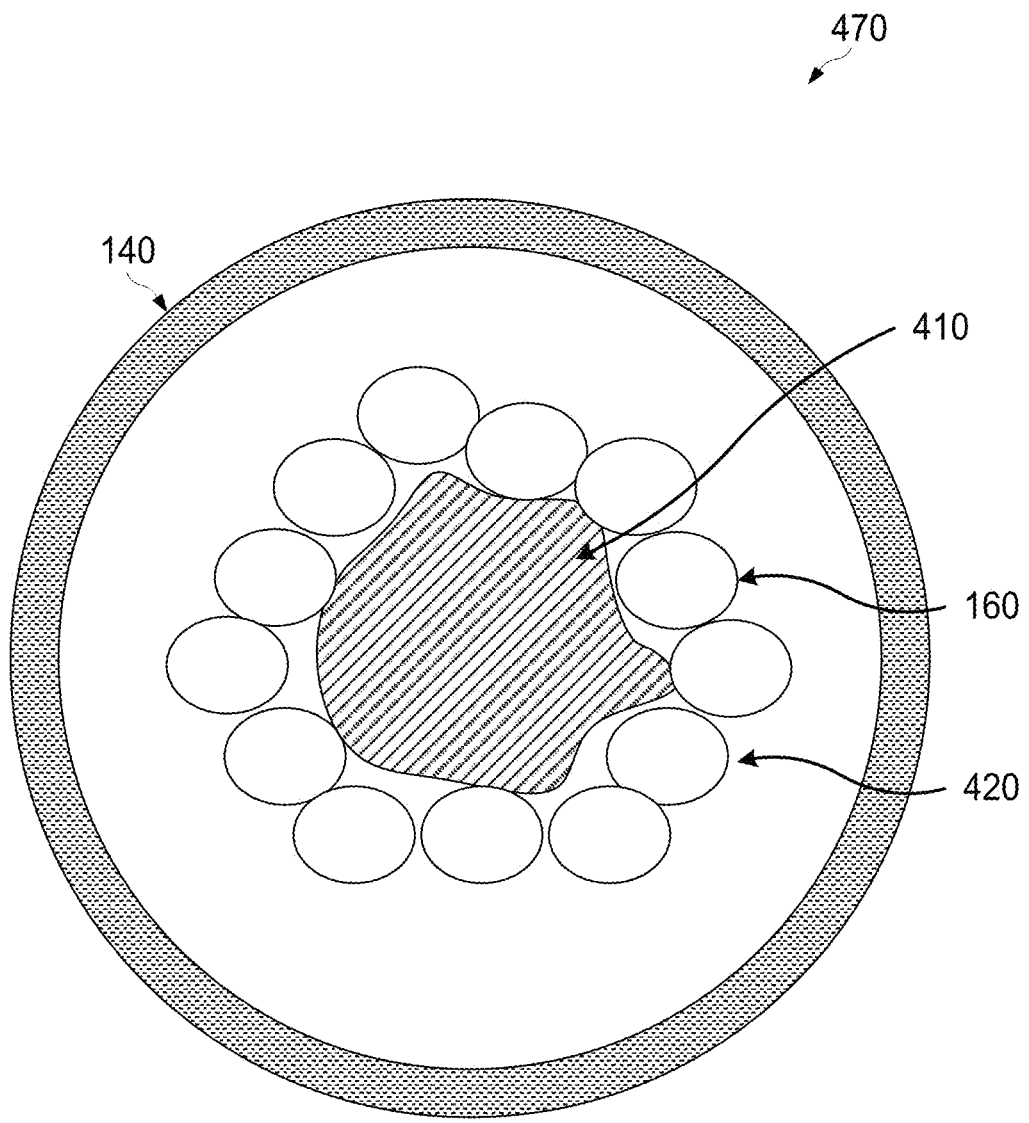

FIG. 4C illustrates a cross-sectional view of an embodiment buffer tube 470 having a swellable-thread 410 and fabricated using an emulsion lubricant. Unlike the buffer tubes 400 and 450, the swellable-thread 410 is surrounded by the one or more optical fibers 160. The optical fibers 160 may be arranged around the swellable-thread 410 after the application of the emulsion lubricant. The swellable-thread 410 absorbs the water in the emulsion lubricant, leaving a layer of silicone 420 between the optical fibers 160 and the polymeric buffer tube 140. In some embodiments, the buffer tube 470 may have an irregular or non-circular shape.

Figure 4D:
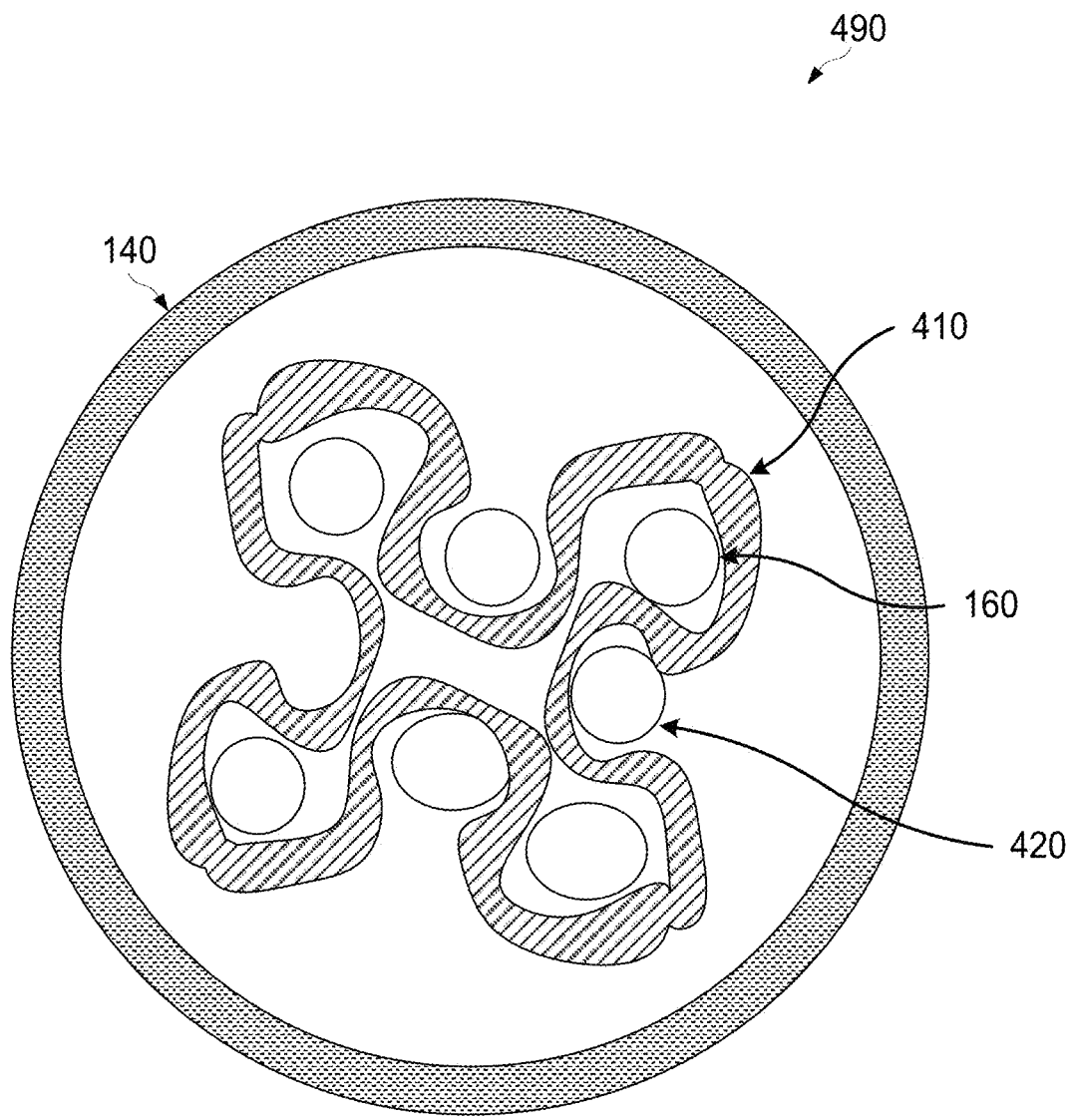

FIG. 4D illustrates a cross-sectional view of an embodiment buffer tube 490 having a swellable-thread 410 and fabricated using an emulsion lubricant. Unlike the buffer tubes 400, 450, and 470, the swellable-thread 410 is interwoven between the optical fibers 160. The swellable-thread 410 absorbs the water in the emulsion lubricant, leaving a layer of silicone 420 between the optical fibers 160 and the polymeric buffer tube 140. In some embodiments, the buffer tube 490 may have an irregular or non-circular shape. In some embodiments, the swellable-thread 410 may consist of more than one thread. As an example, the swellable-thread 410 may include several water-absorbent threads interwoven between the several optical fibers 160.

Figure 5:
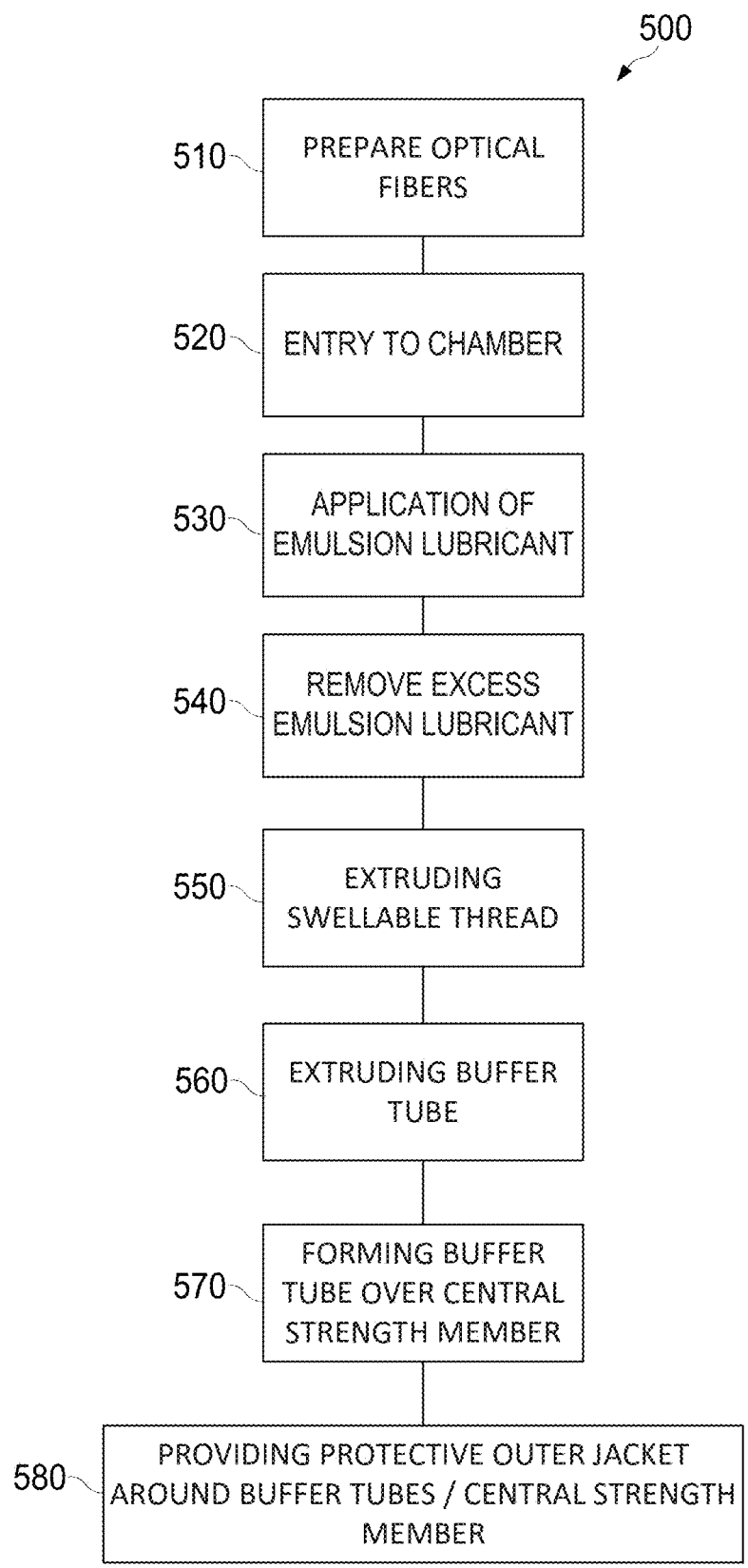
FIG. 5 illustrates a flowchart of an embodiment method for fabricating an optical cable with a buffer tube and using an emulsion lubricant.

FIG. 5 is a flowchart of an embodiment method 500 for fabricating an optical cable with a buffer tube 400, 450, 470, or 490 and using an emulsion lubricant. At step 510, the optical fibers are first rolled, or guided with a guiding die, in the form of the bundle of optical fibers in an irregular or circular shape.

At step 520, a static electricity discharger may be used to remove the repelling force among fibers thus keeping all of the fibers in a bundle. The bundle of optical fibers enter a chamber, for example, at an entry-die or coating head. In some embodiments, the entrance to the chamber may be tapered to advantageously eliminate the negative effects of a sharp edge.

Optical fibers may be deployed in either a single-fiber loose buffer tube or a multi-fiber loose buffer tube. With respect to the latter, multiple optical fibers may be bundled or stranded within a buffer tube or other structure. In this regard, within a multi-fiber loose buffer tube, fiber sub-bundles may be separated with binders (e.g., each fiber sub-bundle is enveloped in a binder). Moreover, fan-out tubing may be installed at the termination of such loose buffer tubes to directly terminate loose-buffered optical fibers with field-installed connectors.

The optical fibers are typically densely packed, bundled in ribbons, and arranged in a stacked form. By separating different bundles of optical fibers 160 within different buffer tubes, cable operators and/or installers are assisted with a more organized cable management arrangement.

In general, it is desirable to increase the filling of optical elements (e.g., optical fibers) in buffer tubes or optical cables, subject to other constraints (e.g., cable or mid-span attenuation). The optical elements themselves may be designed for increased packing density. As an example, the optical fiber 160 may possess modified properties, such as improved refractive-index profile, core or cladding dimensions, or primary-coating thickness and/or modulus, to improve microbending and macrobending characteristics.

At step 530, the bundle of optical fibers 160 are then soaked with the emulsion lubricant inside the chamber. In an embodiment, the emulsion lubricant is applied to the bundle of fiber optics 160 using a spray process, for example, in a misting chamber. In such an embodiment, the application rate of the emulsion lubricant is controlled by the misting rate. In some embodiments, the emulsion lubricant is applied to the surface of the bundle of optical fibers 160 using, for example, a wiping die process in a pre-wet chamber or a chamber filled with the emulsion lubricant. The prewet chamber is built in this manner so that an adequate emulsion lubricant fluid head pressure may be established. This may be accomplished by properly differentiating the positions of the emulsion entry pot and the overflow pot. The emulsion lubricant is sufficiently applied on the outer surface of the fiber bundle only.

The majority of the emulsion lubricant is applied onto the outer surface of the bundle of the optical fibers 160 and a minimal amount within the interior of the bundle of optical fibers 160. In an embodiment, the pre-wet is applied over bundles of twelve optical fibers. Although embodiments with less or more optical fibers 160 per buffer tube may be contemplated.

Generally, it is desirable to reduce the amount of silicone applied to the bundle of optical fibers 160. It has been observed that the percentage of emulsifying agent is (i) directly related to the percentage of silicone in the emulsion lubricant and that (ii) the amount of silicone capable of being dissolved in water, using the emulsifying agent, has an upper limit, at which point the emulsion lubricant becomes unstable and the silicone segregates out. Therefore, the proper percentage of the composition is essential.

At step 540, the bundle of optical fibers 160, soaked in the emulsion lubricant, pass through a chamber-wiping die (e.g., exit-die) to remove any excess emulsion lubricant. In some embodiments, the exit point of the chamber may have a designed "land" length. It is observed, due to slight variations in the outer diameter of bundles of optical fibers 160, some excess silicone may be necessary to improve process reliability. However, it is preferable to minimize the excess silicone as excess silicone may result in dripping and difficulties in splicing of the optical fibers 160.

The wiping die helps to control the application rate of the emulsion lubricant, providing a uniform emulsion lubricant coating. In an embodiment, the diameter of the wiping die is sized nominally slightly larger than the outer diameter of the bundle of optical fibers 160. In one embodiment, the wiping die may be a hole in a piece of metal.

The land length that advantageously controls the amount of emulsion lubricant applied onto the bundle of optical fibers 160. The land length may be from about 0.5 mm to about 50 mm. It is noted that excessively long land length may result in increased optical fiber tension. Additionally, lubricant can push into the bundle of optical fibers as a result of a long land length. The lubricant penetrates the fiber bundle resulting in excessive amounts of silicone lubricant on fibers.

In an example embodiment, an optical fiber 160 has an outer diameter of 245 micrometers (µm) and a cross-sectional area of about 0.04714 millimeter squared ($mm^2$). A bundle of twelve of such optical fibers 160 has a cross-sectional area of about 0.5657 $mm^2$. An exit-die of a chamber with an approximate diameter of 1.0 mm has a cross-sectional area of about 0.7854 $mm^2$. The chamber includes a tapered entrance and a land length of about 2 mm. This results in a fill ratio of about 72%.

The nominal application rate of the emulsion lubricant may be about 10.9 grams/fiber-kilometer (g/fkm) for a single optical fiber or about 130.8 g/fkm for a bundle of twelve optical fibers. The application rate of emulsion lubricant may range from about 8 g/fkm for a single optical fiber or about 96 g/fkm for a bundle of twelve optical fibers to about 15 g/fkm for a single optical fiber or 180 g/fkm for a bundle of twelve optical fibers.

In one embodiment, the application rate of the emulsion lubricant may range from about 5.0 g/fkm for a single optical fiber or about 60 g/fkm for a bundle of twelve optical fibers to about 15 g/fkm for a single optical fiber or about 180 g/fkm for a bundle of twelve optical fibers. Preferentially a reduced application at a level of 5.0 g/fkm or below is desired.

At step 550, a swellable-thread is added to the one or more optical fibers. The ions in the swellable-thread 410 absorb the water of the emulsion lubricant, leaving a thin layer of silicone around the optical fibers. In one embodiment, the swellable-thread 410 surrounds the one or more optical fibers 160. In another embodiment, the swellable-thread 410 is surrounded by the one or more optical fibers 160. In yet another embodiment, the swellable-thread 410 is interwoven with the one or more optical fibers. In this embodiment, the swellable-thread 410 is located in-between the one or more optical fibers. In the embodiments where the water swellable-thread is surrounded by, interwoven with, or located in-between the one or more optical fibers, step 550 may take place simultaneously with step 510.

At step 560, the swellable-thread 410 resulting bundle is positioned within the polymeric buffer tube 140. In one embodiment, the swellable-thread 410 is a UV cured swellable coating. In another embodiment, the swellable-thread 410 is a tape or a yarn carrying a water-swellable material (e.g., water-swellable powder). In an embodiment, the emulsion lubricant may be used in combination with a water resistant optical fiber coating and coloring system as some optical fiber coatings have shown an increase in attenuation after soaking water.

Optionally, at step 570, the buffer tubes are provided externally adjacent to a central strength member or a radial strength member (RSM). In some embodiments, the optical cable may not have a rigid strength member.

At step 580, a protective outer jacket 180 is provided around the buffer tubes 400 and the central strength member 120 to form an optical cable.

Figure 6:
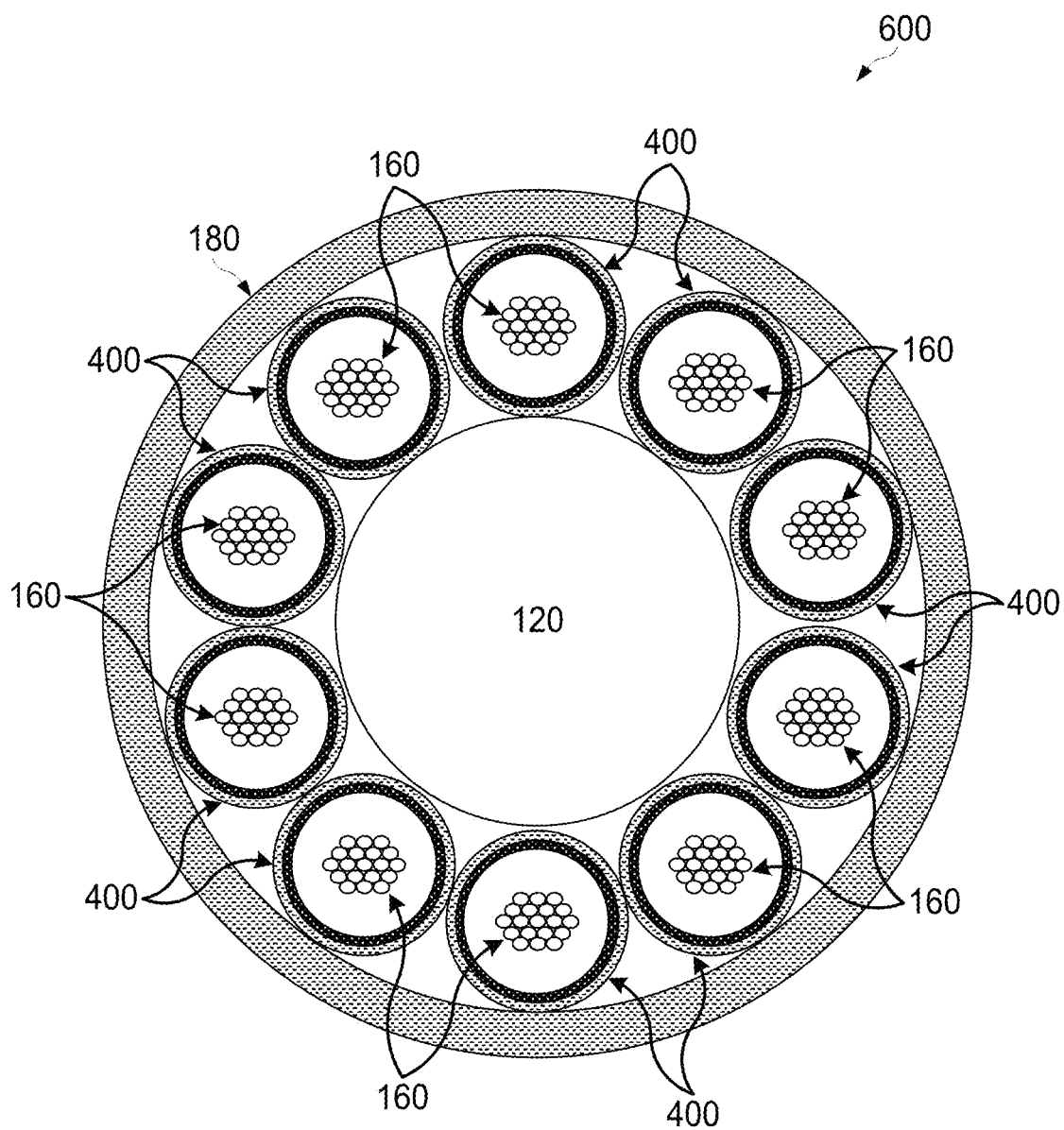
FIG. 6 illustrates a cross-sectional view of an optical cable comprising the buffer tube.

FIG. 6 illustrates a cross-sectional view of an embodiment optical cable 600. The optical cable 600 includes a central strength member 120, buffer tubes 400, and a protective outer jacket 180. The central strength member 120 is positioned at the middle of the optical cable 600. Buffer tubes 400 are provided externally adjacent to the central strength member 120. Each buffer tube 400 contains one or more optical fibers 160. The protective outer jacket 180 is provided around the buffer tubes 400 and the central strength member 120.

The central strength member 120 is made from a rigid material, such as metallic elements, glass reinforced composite rods (e.g., glass-reinforced epoxy), aramid reinforced composite rods, or composite rods made from material with high modulus and low coefficient of expansion (e.g., carbon fiber). The central strength member 120 is the primary anti-buckling element in the optical cable 600 and provides mechanical integrity to the optical cable 600, particularly under heavy stress.

As an example, during installation, the optical cable 600 may be subjected to significant strain. The central strength member 120 provides tensile strength to keep optical fibers 160 within the designated strain limit. The central strength member 120 also resists cable contraction at low temperatures and prevents optical fiber buckling, which would otherwise occur due to differential coefficient of expansion between optical fibers and other plastic cable components. The central strength member 120 additionally prevents the optical cable 600 from being compressed and provides a primary clamping point for hardware used to connect the cable to the splice or routing enclosures.

The buffer tube 400 may include single-mode optical fibers and/or multimode optical fibers. An optical fiber 160 typically includes a component glass fiber (i.e., glass core and surrounding cladding layers) and one or more coating layers (e.g., primary coating and second coating). At least one of the coating layers—typically the secondary coating—may be colored and/or possess other markings to help identify individual fibers. Alternatively, a tertiary ink layer may surround the primary and secondary coatings, in which case the tertiary ink layer is considered to be the outermost optical-fiber coating layer.

The respective coating layers typically possess a urethane-acrylate chemistry. As an example, after curing, an exemplary urethane-acrylate primary coating might possess (i) an in situ modulus of less than about 0.65 millipascal (MPa) (e.g., less than 0.5 MPa, such as between about 0.2 MPa and 0.4 MPa) and (ii) a glass transition temperature of less than about −500 Celsius (C), and an exemplary urethane-acrylate secondary coating might possess a modulus of between about 800 MPa and 1,000 MPa (e.g., about 900 MPa). Exemplary optical-fiber coatings are disclosed in commonly assigned U.S. Pat. No. 8,265,442 for a Microbend-Resistant Optical Fiber (Overton) and/or commonly assigned U.S. Patent Application Publication No. 2010/0119202 A1 for a Reduced-Diameter Optical Fiber (Overton), each of which is incorporated by reference in its entirety.

In one embodiment, the optical fibers 160 include one or more multimode optical fibers (e.g., conventional multimode optical fibers with a 50-micron core, such as OM2 multimode optical fibers, that comply with the ITU-T G.651.1 recommendations). The ITU-T G.651.1 (July 2007) recommendations are hereby incorporated by reference in their entirety. An exemplary multimode optical fiber that may be employed is MaxCap™ multimode optical fibers (OM2+, OM3, or OM4), which are commercially available from Draka (Claremont, N.C.). In another embodiment, the present buffer tube includes a plurality of standard single-mode optical fibers (SSMF).

In contrast, in accordance with the ITU-T G.651.1 recommendations, standard multimode optical fibers have macrobending losses of (i) no more than 1 dB at a wavelength of 850 nanometers for a winding of two turns around a spool with a bending radius of 15 millimeters and (ii) no more than 1 dB at a wavelength of 1300 nanometers for a winding of two turns around a spool with a bending radius of 15 millimeters. Moreover, as measured using a winding of two turns around a spool with a bending radius of 15 millimeters, such standard multimode optical fibers typically have macrobending losses of (i) greater than 0.1 dB, more typically greater than 0.2 dB (e.g., 0.3 dB or more), at a wavelength of 850 nanometers and (ii) greater than 0.3 dB, more typically greater than 0.4 dB (e.g., 0.5 dB or more), at a wavelength of 1300 nanometers.

Multimode optical fibers are advantageous, because their relatively large core diameter facilitates easy connectorization. Accordingly, it is within the scope of the present disclosure to employ multimode optical fibers having enlarged core diameters (e.g., 62.5 microns or greater), such as between about 70 microns and 100 microns (e.g., about 80 microns).

In yet another embodiment, the buffer tube includes a plurality of bend-insensitive single-mode optical fibers. Bend-insensitive optical fibers perform better (i.e., are less susceptible to attenuation) than standard optical fibers in the mid-span temperature-cycle test at high buffer-tube filling coefficients. Accordingly, bend-insensitive optical fibers facilitate a reduction in buffer-tube inner diameter and/or an increase in EFL tolerance.

The buffer tube may include bend-insensitive multimode optical fibers, such as MaxCap™-BB-OMx multimode optical fibers, which are commercially available from Draka (Claremont, N.C.). In this regard, bend-insensitive multimode optical fibers typically have macrobending losses of (i) no more than 0.1 dB at a wavelength of 850 nanometers for a winding of two turns around a spool with a bending radius of 15 millimeters and (ii) no more than 0.3 dB at a wavelength of 1300 nanometers for a winding of two turns around a spool with a bending radius of 15 millimeters.

Moreover, the buffer tubes typically have excess fiber length (EFL) of less than about 0.25 percent, typically less than about 0.15 percent (e.g., 0.05 percent or less). Excess fiber length may be determined by sectioning a ten-meter sample of the buffer tube that has equilibrated for at least 24 hours after manufacture and thereupon comparing the length of constituent optical fibers against the sectioned ten-meter sample.

Although the foregoing description discusses loose buffer tubes containing discrete optical fibers (i.e., non-ribbonized optical fibers), the present disclosure also embraces buffer tubes containing optical-fiber ribbons. The pre-wetting agent should possess an excellent surface affinity, wetting, and/or interfacial adhesion with the outer ribbon matrix material (e.g., a urethane-acrylate composition).

In this regard, optical fibers 160 may be sandwiched, encapsulated, and/or edge bonded to form an optical fiber ribbon. Optical fiber ribbons can be divisible into subunits (e.g., a twelve-fiber ribbon that is splittable into six-fiber subunits). Moreover, a plurality of such optical fiber ribbons may be aggregated to form a ribbon stack, which can have various sizes and shapes.

As an example, it is possible to form a rectangular ribbon stack or a ribbon stack in which the uppermost and lowermost optical fiber ribbons have fewer optical fibers 160 than those toward the center of the stack. This construction may be useful to increase the density of optical elements (e.g., optical fibers) within the buffer tube 400 and/or optical cable 600.

By way of example, a rectangular ribbon stack may be formed with or without a central twist (i.e., a "primary twist"). A ribbon stack is typically manufactured with rotational twist to allow the buffer tube 400 or optical cable 600 to bend without placing excessive mechanical stress on the optical fibers 160 during winding, installation, and use. In a structural variation, a twisted (or untwisted) rectangular ribbon stack may be further formed into a coil-like configuration (e.g., a helix) or a wave-like configuration (e.g., a sinusoid). In other words, the ribbon stack may possess regular "secondary" deformations.

A plurality of buffer tubes 400 may be positioned externally adjacent to and stranded around the central strength member 120. This stranding can be accomplished helically in one direction, known as "S" or "Z" stranding, or via Reverse Oscillated Lay stranding, known as "S-Z" stranding. Stranding about the central strength member 120 reduces optical fiber strain when optical cable strain occurs during installation and use. Minimizing fiber strain benefits both tensile cable strain and longitudinal compressive cable strain during installation or operating conditions.

With respect to tensile cable strain, which may occur during installation, the optical cable 600 will become longer while the optical fibers 160 can migrate closer to the cable's neutral axis to reduce, if not eliminate, the strain being translated to the optical fibers 160. With respect to longitudinal compressive strain, which may occur at low operating temperatures due to shrinkage of the cable components, the optical fibers 160 will migrate farther away from the cable's neutral axis to reduce, if not eliminate, the compressive strain being translated to the optical fibers 160.

In a stranding variation, two or more substantially concentric layers of buffer tubes may be positioned around a central strength member 120. In a further variation, multiple stranding elements (e.g., multiple buffer tubes stranded around a strength member) may themselves be stranded around each other or around a central strength member 120.

Alternatively, a plurality of the present buffer tubes may be simply placed externally adjacent to the central strength member 120 (i.e., the buffer tubes 400 are not intentionally stranded or arranged around the central strength member 120 in a particular manner and run substantially parallel to the central strength member 120).

Alternatively still, the optical fibers 160 may be positioned within a central buffer tube (i.e., the central buffer tube cable has a central buffer tube rather than a central strength member). Such a central buffer tube cable may position strength members elsewhere. For instance, metallic or non-metallic (e.g., GRP) strength members may be positioned within the cable sheath itself, and/or one or more layers of high-strength yarns (e.g., aramid or non-aramid yarns) may be positioned parallel to or wrapped (e.g., contra-helically) around the central buffer tube (i.e., within the cable's interior space). As will be understood by those having ordinary skill in the art, such strength yarns provide tensile strength to optical cables 600. Likewise, strength members can be included within the buffer tube's casing. Strength yarns may be coated with a lubricant (e.g., fluoropolymers), which may reduce unwanted attenuation in optical cable 600 (e.g., rectangular, flat ribbon cables or round, loose tube cables) that are subjected to relatively tight bends (i.e., a low bend radius). Moreover, the presence of a lubricant on strength yarns (e.g., aramid strength yarns) may facilitate removal of the cable jacketing by reducing unwanted bonding between the strength yarns and the surrounding cable jacket.

In another cabling embodiment, multiple buffer tubes may be stranded around themselves without the presence of a central member. These stranded buffer tubes may be surrounded by a protective tube. The protective tube may serve as the outer casing of the optical cables 600 or may be further surrounded by an outer sheath. The protective tube may either tightly surround or loosely surround the stranded buffer tubes.

Additional elements may be included within a cable core. As an example, copper cables or other active transmission elements may be stranded or otherwise bundled within the cable sheath. Passive elements may also be placed within the cable core, such as between the interior walls of the buffer tubes and the enclosed optical fibers 160. Alternatively and by way of example, passive elements may be placed outside the buffer tubes between the respective exterior walls of the buffer tubes and the interior wall of the cable jacket, or within the interior space of a buffer-tube-free cable.

As an example, yarns, nonwovens, fabrics (e.g., tapes), foams, or other materials containing water-swellable material and/or coated with water-swellable materials (e.g., including super absorbent polymers (SAPs), such as SAP powder) may be employed to provide water blocking and/or to couple the optical fibers 160 to the surrounding buffer tube and/or cable jacketing (e.g., via adhesion, friction, and/or compression).

Moreover, an adhesive (e.g., a hot-melt adhesive or curable adhesive, such as a silicone acrylate cross-linked by exposure to actinic radiation) may be provided on one or more passive elements (e.g., water-swellable material) to bond the elements to the buffer tube. An adhesive material may also be used to bond the water-swellable element to optical fibers 160 within the buffer tube.

Cable enclosing buffer tubes may have a sheath formed from various materials in various designs. Cable sheathing may be formed from polymeric materials such as, for example, polyethylene, polypropylene, polyvinyl chloride (PVC), polyamides (e.g., nylon), polyester (e.g., PBT), fluorinated plastics (e.g., perfluorethylene propylene, polyvinyl fluoride, or polyvinylidene difluoride), and ethylene vinyl acetate. The sheath and/or buffer tube materials may also contain other additives, such as nucleating agents, flame-retardants, smoke-retardants, antioxidants, UV absorbers, and/or plasticizers.

The cable sheathing may be a single jacket formed from a dielectric material (e.g., non-conducting polymers), with or without supplemental structural components that may be used to improve the protection (e.g., from rodents) and strength provided by the cable sheath. As an example, one or more layers of metallic (e.g., steel) tape, along with one or more dielectric jackets, may form the cable sheathing. Metallic or fiberglass reinforcing rods (e.g., GRP) may also be incorporated into the sheath. In addition, aramid, fiberglass, or polyester yarns may be employed under the various sheath materials (e.g., between the cable sheath and the cable core), and/or ripcords may be positioned, for example, within the cable sheath. Similar to buffer tubes 400, optical cable sheaths typically have a circular cross section, but optical cable sheaths alternatively may have an irregular or non-circular shape (e.g., an oval, trapezoidal, or flat cross-section).

As noted, the optical fibers 160 (e.g., loose or ribbonized fibers) in the buffer tube 400 may be stranded (e.g., around a central strength member). In such configurations, an optical cable protective outer sheath may have a textured outer surface that periodically varies lengthwise along the optical cable 600 in a manner that replicates the stranded shape of the underlying buffer tubes 400. The textured profile of the protective outer sheath can improve the blowing performance of the optical cable 600. The textured surface reduces the contact surface between the cable and the duct or microduct and increases the friction between the blowing medium (e.g., air) and the optical cable 600. The protective outer sheath may be made of a low coefficient-of-friction material, which can facilitate blown installation. Moreover, the protective outer sheath can be provided with a lubricant to further facilitate blown installation.

In accordance with the foregoing, the buffer tubes 400 may be assembled into various optical cables. An exemplary optical cable may include a plurality of buffer tubes 400 (e.g., between two and twelve buffer tubes 400, such as ten buffer tubes shown in FIG. 6). The individual buffer tubes are in close proximity to the other buffer tubes 400 and the central strength member 120. As an example, in an optical cable 600 containing ten buffer tubes, an individual buffer tube may contact two adjacent buffer tubes, the central strength member 120, and the protective outer jacket 180 (i.e., the ten buffer tubes are positioned around the central strength member 120 as depicted in FIG. 6).

Typically, all of the buffer tubes within a single optical cable have the same outer diameters and inner diameters. As an example, if the optical cable contains ten buffer tubes, all ten buffer tubes have the same outer diameter and inner diameter. The buffer tubes in accordance with the present disclosure may have an outer diameter ranging from about 1.3 millimeters to about 3 millimeters (e.g., about 1.50 to 2.55 millimeters). In an embodiment, the buffer tubes 400 may have an outer diameter of about 2.0 millimeters. In another embodiment, the buffer tubes 400 may have an outer diameter of less than about 3 millimeters (e.g., about 2.5 to 3.0 millimeters). In yet another embodiment, the buffer tubes 400 may have an outer diameter of 3.0 millimeters and an inner diameter of 2.2 millimeters. That said, buffer tubes having varying inner diameters and varying outer diameters are within the scope of the present disclosure. The shapes of the buffer tubes within a single optical cable may vary (i.e., all of the buffer tubes are not required to have the same shape).

The optical fibers 160, which are coated with a thin layer of emulsion lubricant in accordance with the present disclosure, may be distributed evenly among the buffer tubes 400 (i.e., each buffer tube contains an equal number of optical fibers 160). As an example, an optical cable 600 containing 144 optical fibers 160 and ten buffer tubes 400 may have twenty-four optical fibers per buffer tube 400. In one exemplary embodiment, the optical cable 600 includes twelve buffer tubes 400, each buffer tube containing twenty-four, pre-wet optical fibers.

The buffer tubes 400 containing the optical fibers 160 may be stranded around the central strength member 120. As an example, the buffer tubes 400 can be positioned externally adjacent to and stranded around the central strength member 120. The stranding can be accomplished in one direction, helically, known as "S" stranding, or Reverse Oscillated Lay stranding, known as "S-Z" stranding. Stranding about the central strength member 120 increases the operational and installation flexibility of the optical cable 600. S-Z stranding, for example, allows easy unraveling of the buffer tubes 400 for mid-span access.

In other embodiments, the buffer tubes 400 containing the optical fibers 160 are simply placed externally adjacent to the central strength member 120 (i.e., the buffer tubes 400 are not intentionally stranded or arranged around the central strength member 120 in a particular manner and run substantially parallel to the central strength member 120).

The protective outer jacket 180 encapsulates the one or more buffer tubes 400. In some embodiments, the protective outer jacket 180 maintains a substantially uniform thickness over the length of the optical cable 600. The thickness of the protective outer jacket 180 may be adjusted to reduce or increase the overall diameter of the optical cable 600 or to provide greater protection to the optical cable 600. In one embodiment, the protective outer jacket 180 is 0.6 millimeter thick.

The protective outer jacket 180 may be made of a low coefficient-of-friction material, which can facilitate blown installation. Yet, in other embodiments, the protective outer jacket 180 can be provided with a lubricant to further facilitate blown installation. The protective outer jacket 180 is typically made of polymeric materials, such as polyurethane, polyethylene, nylon, PVC or other suitable material. The protective outer jacket 180 may include other materials known to be suitable for use as a protective outer jacket In some embodiments, the protective outer jacket 180 fits tightly around and conforms to the outside of the buffer tubes 400 in such a way that it substantially fills the gaps between adjacent buffer tubes. In this particular embodiment, the protective outer jacket 180 is thin (e.g., 0.6 millimeter thick or so) so that the external surface of the optical cable 600 is textured rather than smooth.

In some embodiments, the buffer tubes 400 are stranded (e.g., S stranded or S-Z stranded) around the central strength member 120. In such embodiments, the textured outer surface of the optical cable 600 periodically varies lengthwise along the optical cable 600 in a manner that replicates the stranded shape of the underlying buffer tubes 400. The textured profile of the protective outer jacket 180 of this embodiment further improves the blowing performance of the optical cable 600. The textured surface reduces the contact surface between the optical cable 600 and the microduct and increases the friction between the blowing medium (e.g., air or liquid) and the optical cable 600.

While it is understood that an optical cable may include multiple buffer tubes, each encapsulating multiple optical fibers, a limited number of symmetric buffer tubes and optical fibers 160 are illustrated in FIG. 6 for simplicity of discussion and illustration. Additionally, each buffer tube 400 and/or optical fiber 160 may have the same or different inner and outer diameter dimension. The shapes of the buffer tubes within a single optical cable may vary (i.e., all of the buffer tubes 400 are not required to have the same shape). These are not intended to limit either the scope or the spirit of the example embodiment in FIG. 6. Likewise, any limitation in the number of components found in subsequent embodiments are non-limiting and are illustrated as such for practical illustration and discussion considerations. Exemplary optical cable designs are disclosed in commonly assigned U.S. Pat. No. 7,970,247, which is hereby incorporated herein by reference in its entirety. It should be noted that although FIG. 6 includes the buffer tube 400 as an example buffer tube in the optical cable 600, optical cables having buffer tube 450 or a combination of buffer tube 400 and/or 450 may also be contemplated.

As an emulsion system may entrain water into the fiber optic buffer tube, and some optical fibers and optical fiber coating systems can show sensitivity to water, it may be beneficial that the system be environmentally robust to the presence of water in the emulsion. The optical fiber coating, inking, and emulsion system may be capable of withstanding a period of at least 90 days of water exposure or humidity conditioning tests at 60 degrees Celsius (0 C) with an increase in attenuation that is less than 0.1 decibel/kilometer (dB/km), and preferentially less than 0.05 dB/km at a wavelength of 1550 nanometer (nm). Examples of such testing could be water immersion or conditioning at elevated humidity (85%) of buffer tubes containing the fiber/emulsion system. An example of test results are included in the Table 1 below.

TABLE 1

| | Attenuation Aging | | | |
|---|---|---|---|---|
| | Initial RT Measurement | Initial 60° C. Measurement | Final 60° C. Measurement | |
| | Atten. LSA (dB/km) | Atten. LSA (dB/km) | Atten. LSA (dB/km) | Δ Atten. LSA (dB/km) |
| BL | 0.243 | 0.223 | 0.195 | −0.028 |
| OR | 0.221 | 0.203 | 0.190 | −0.013 |
| GN | 0.198 | 0.196 | 0.187 | −0.009 |
| BN | 0.224 | 0.209 | 0.192 | −0.017 |
| SL | 0.208 | 0.203 | 0.182 | −0.021 |
| WH | 0.223 | 0.216 | 0.199 | −0.017 |
| RD | 0.215 | 0.191 | 0.180 | −0.011 |
| BK | 0.23 | 0.21 | 0.198 | −0.012 |
| YL | 0.219 | 0.197 | 0.185 | −0.012 |
| VI | 0.245 | 0.236 | 0.233 | −0.003 |
| RS | 0.204 | 0.202 | 0.204 | 0.002 |
| AQ | 0.214 | 0.208 | 0.184 | −0.024 |

In the Table 1 above, the least square approximation (LSA) measurement of the attenuation (Atten) per kilometer (km) in decibels (Atten. LSA (dB/km)) for an initial measurement at room temperature (RT), initial measurement at 60° C., and a final measurement (after 210 days) at 60° C. are shown. The various rows (BL, OR, etc.) are illustrative of a variety of parts that are used to determine a change in attenuation. As illustrated in the Table 1 above, the change in the least square approximation measurement of the attenuation per kilometer (Δ Atten. LSA (dB/km) is less than 0.1.

Figure 7:
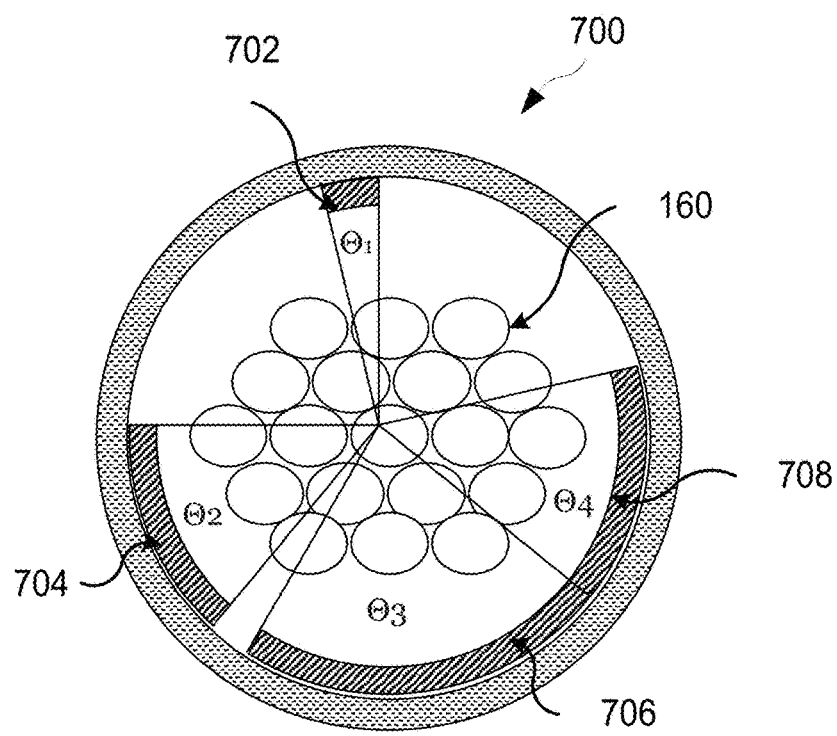
FIG. 7 illustrates a cross-sectional view of an embodiment buffer tube manufactured using a silicone based emulsion process.

FIG. 7 illustrates a cross-sectional view of an embodiment buffer tube 700 manufactured using an emulsion lubricant. As shown, a first thin layer of silicone 702 covers about a 5 degree portion (i.e., $\Theta_1=5$ degrees) of the circumference of the outer surface of the optical fibers 160. A second thin layer of silicone 704 covers about a 45 degree portion (i.e., $\Theta_2=45$ degrees) of the circumference of the outer surface of the optical fibers 160. A third layer of silicone 706 covers about a 60 degree portion (i.e., $\Theta_3=60$ degrees) of the outer surface of the optical fibers 160. A fourth layer of silicone 708 covers about a 50 degree (i.e., $\Theta_4=50$ degrees) portion of the outer surface of the optical fibers 160. The thin layer of silicone 702, 704, 706, and 708 consists of layers of interconnected silicon and oxygen atoms located at the surface of the bundle of optical fibers 160.

As illustrated, the third layer of silicone 706 and fourth layer of silicone 708 are comprised of molecules of silicone. The first layer of silicone 702 and second layer of silicone 704 are discontinuous from the other layers. In other embodiments, the thin layer of silicone may consist of one or more continuous or discontinuous layers of silicone covering some—at least 5 percent of the circumference and up to a 360-degree coverage of the circumference of the outer surface of the optical fibers. The thin layer of silicone may be monolayer (e.g., about 2 or 3 angstroms) or multi layers of molecules having a thickness (i.e., depth) of between about 0.5 nanometers (nm) to 5 nm. The illustration in Figure of 7 is for discussion purposes and is a non-limiting example. As an example, the optical fibers may be arranged in a non-circular formation.

The thin layer of silicone is different from a silicone powder. A silicone powder, such as a silicone resin powder (e.g., crosslinked structure), a silicone rubber powder (crosslinked polymer), or a hybrid silicone powder (e.g., rubber powders covered with resin) by itself or within a resin or ink includes a number of discontinuous spherical shaped molecules. The presence of silicone powders can be differentiated from a silicone fluid by a combination of examination under a microscope and Fourier-transform infrared spectroscopy (FTIR) identification of the powder species. The thin layer of silicone remains in the buffer tube after absorption of the water from the emulsion lubricant that was applied to the one or more optical fibers during manufacturing the buffer tube. Not all water from the emulsion lubricant is absorbed by the swellable-thread and some small amount of water remains present in the thin layer of silicone, while most of the water is absorbed in the swellable-thread.

Figure 8:
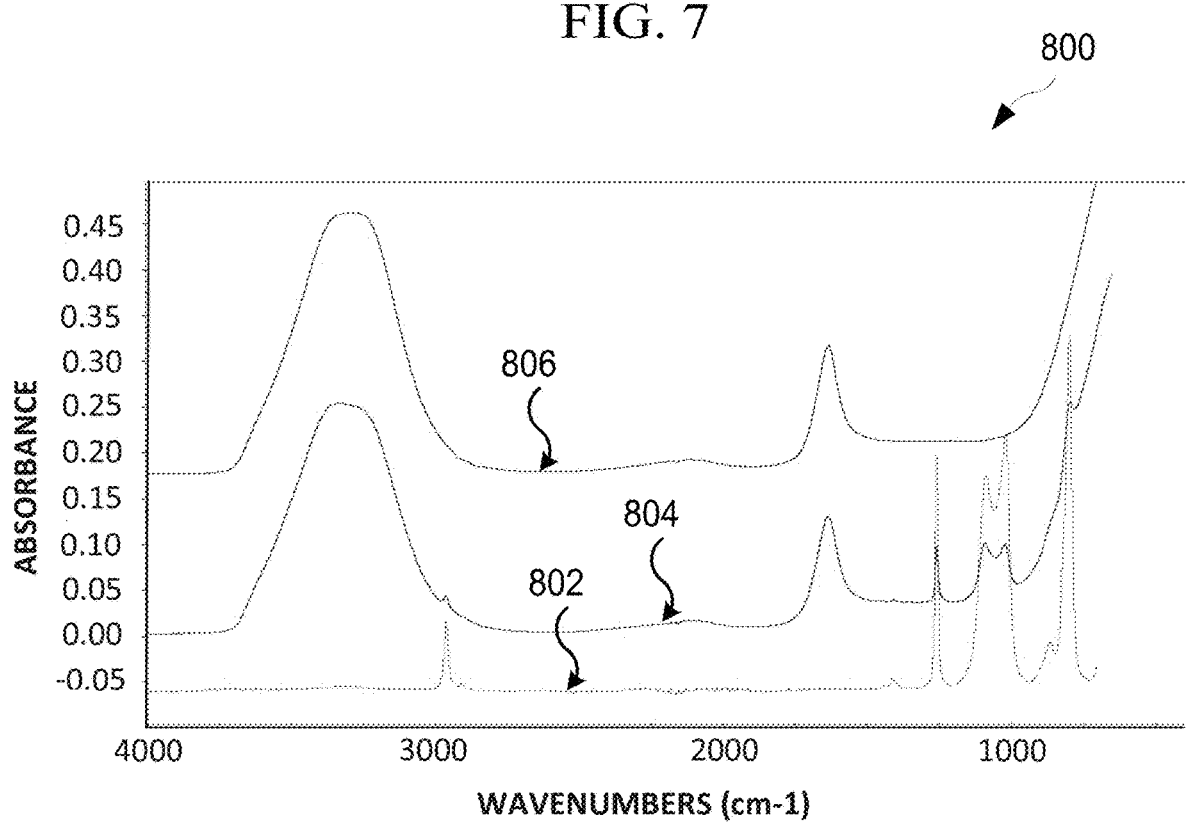
FIG. 8 illustrates a Fourier-transform infrared spectroscopy (FTIR) of various lubricants on optical fibers.

FIG. 8 is a FTIR illustrating a first infrared spectrum 804 of a fiber surface removed from a first buffer tube manufactured using an embodiment emulsion lubricant such as Polywater FFTx. A second infrared spectrum 806 water and a third infrared spectrum 802 of a third gel-free buffer tube manufactured using functionalized silicone are also illustrated. The fiber surface from a fiber in a first buffer tube manufactured using an emulsion lubricant is as discussed in one embodiment and has a FTIR spectrum that is uniquely identifiable from a standard silicone lubricant, functionalized silicone lubricant, or silicone powder.

As an example, at around a wavenumber of 3300 cm$^{-1}$, a characteristic absorption (i.e., bond vibration frequency) associated with hydroxyl (OH) functionality of water is present in the thin layer of silicone and in the infrared spectrum 804 associated with the thin layer of silicone. The thin layer of silicone also contains other peaks corresponding to specific bond vibrational frequencies. Thus, an infrared spectroscopy can be used to detect and differentiate between the emulsion based lubricant and other fiber lubricant systems used in optical buffer tube manufacturing.

As the percentage of silicone used to manufacture an optical cable buffer tube using the emulsion process—as disclosed in the embodiments above—is less than about 10% (e.g., less than about 10% to about 1%), the total amount of silicone used to manufacture an optical cable can be reduced by a factor of about 20 in comparison to a gel-free loose buffer tube manufactured using, for example, functionalized silicone as a lubricant.

Figure 9A:
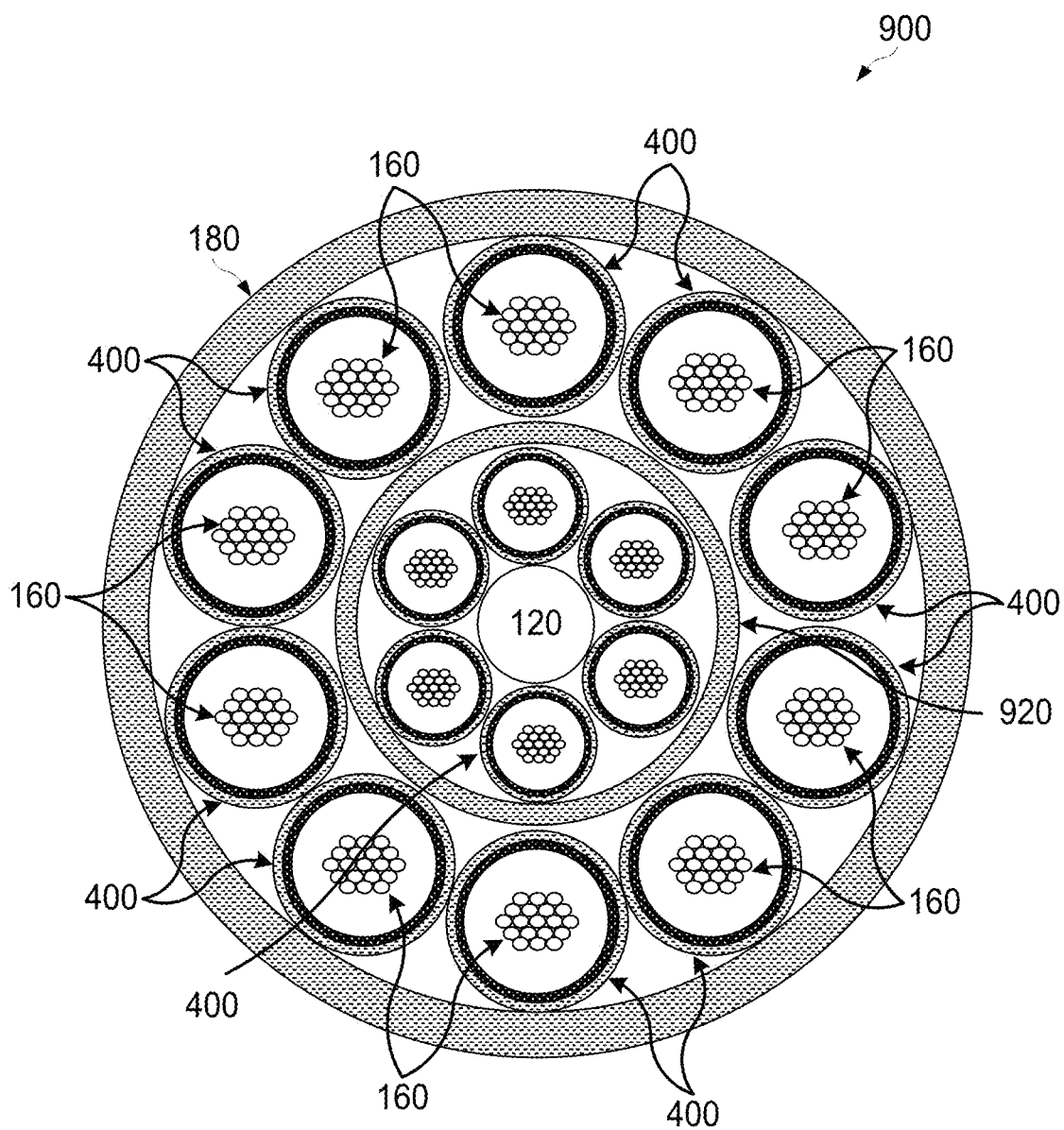
Figure 9B:
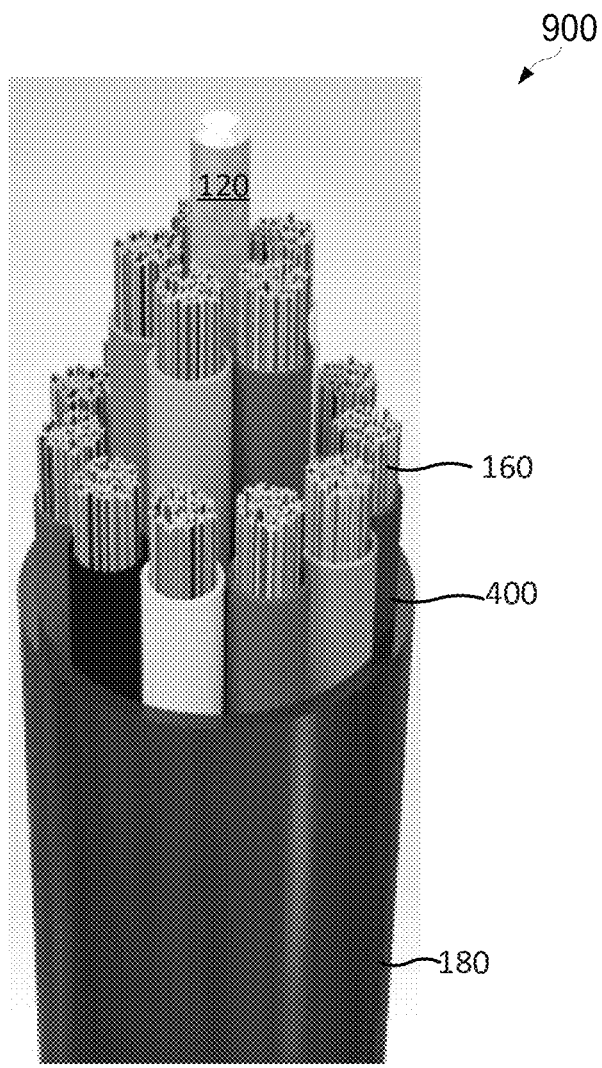

FIGS. 9A-B illustrate a specific design for an optical cable 900 in accordance with an alternative embodiment of the disclosure, wherein FIG. 9A illustrates a cross-sectional view of the optical cable 900 prior to compression and FIG. 9B illustrates a corresponding projection view.

FIGS. 9A-B illustrate an alternative design of an optical cable 900 in which the buffer tubes 400 are arranged in multiple concentric paths around a central strength member 120. In addition, after the first row of the buffer tubes 400 are arranged, a support layer 920 may be introduced for reinforcing the first row of the buffer tubes 400. The support layer 920 may comprise a material having sufficient property to reinforce the buffer tubes 400 that are enclosed by it and deformable so that it can be squeezed or deformed. Examples of materials used for the support layer 920 include polypropylene, polyethylene, nylon, polyurethane, and others.

In an example embodiment, the optical cable 900 may have five buffer tubes 400 in the first row and eleven buffer tubes 400 in the second row. Each buffer tube 400 contains 432 optical fibers 160.

Figure 10A:
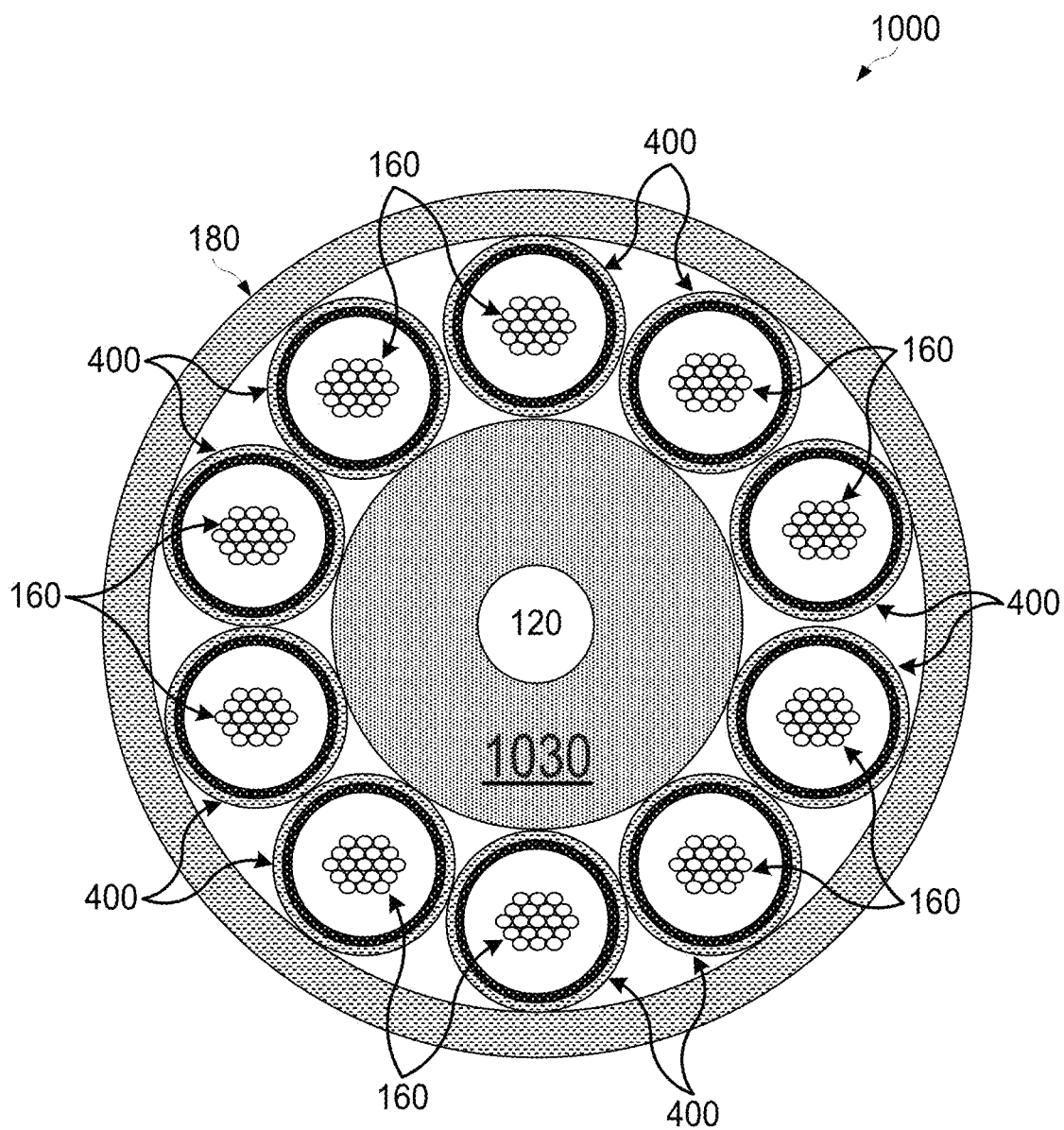
Figure 10B:
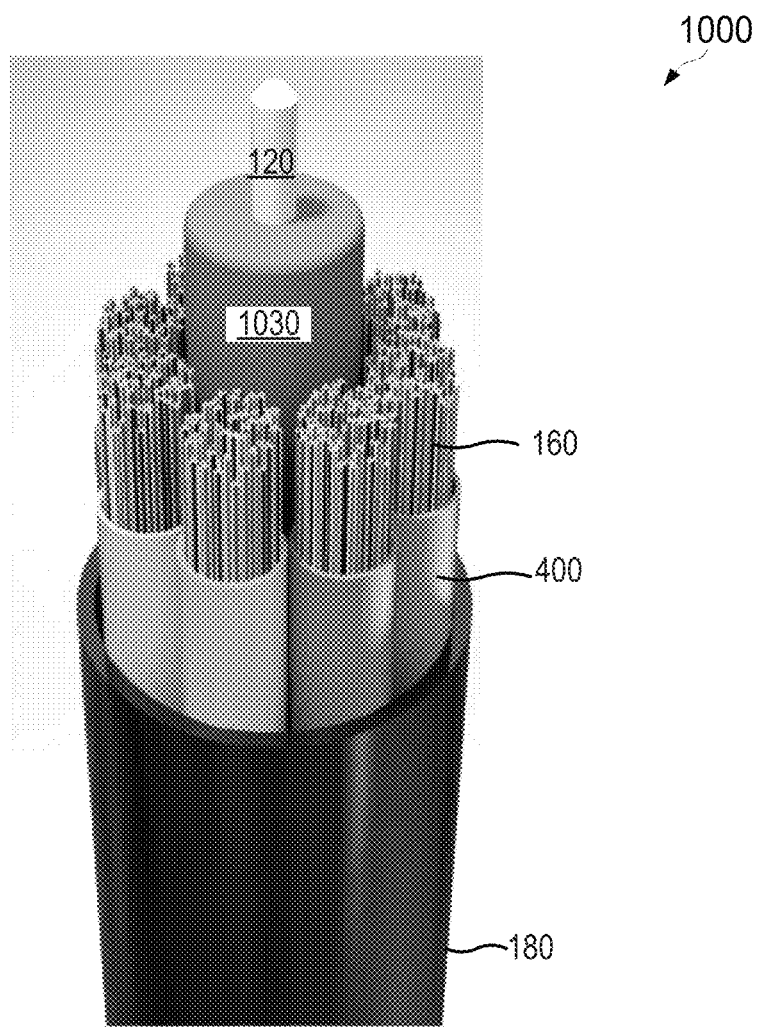

FIGS. 10A-B illustrate a specific design for an optical cable 1000 in accordance with an alternative embodiment of the disclosure, wherein FIG. 10A illustrates a cross-sectional view of the optical cable 1000 prior to compression and FIG. 10B illustrates a corresponding projection view.

A deformable upjacket 1030 surrounds the central strength member 120. In various embodiments, the thickness of the deformable upjacket 1030 may be different from the diameter of the central strength member 120. As illustrated, the thickness of the deformable upjacket 1030 may be larger than the diameter of the central strength member 120. However, in other embodiments, the thickness of the deformable upjacket 1030 may be the same as the diameter of the central strength member 120. In one embodiment, the thickness of the deformable upjacket 1030 may be similar to the diameter of the central strength member 120. The buffer tubes 400 are arranged around the outer periphery of the deformable upjacket 1030.

In an exemplary embodiment, the optical cable 1000 may have eight buffer tubes. Each buffer tube may contain 864 optical fibers. Thus, the optical cable 1000 includes 6912 fibers.

Figure 11A:
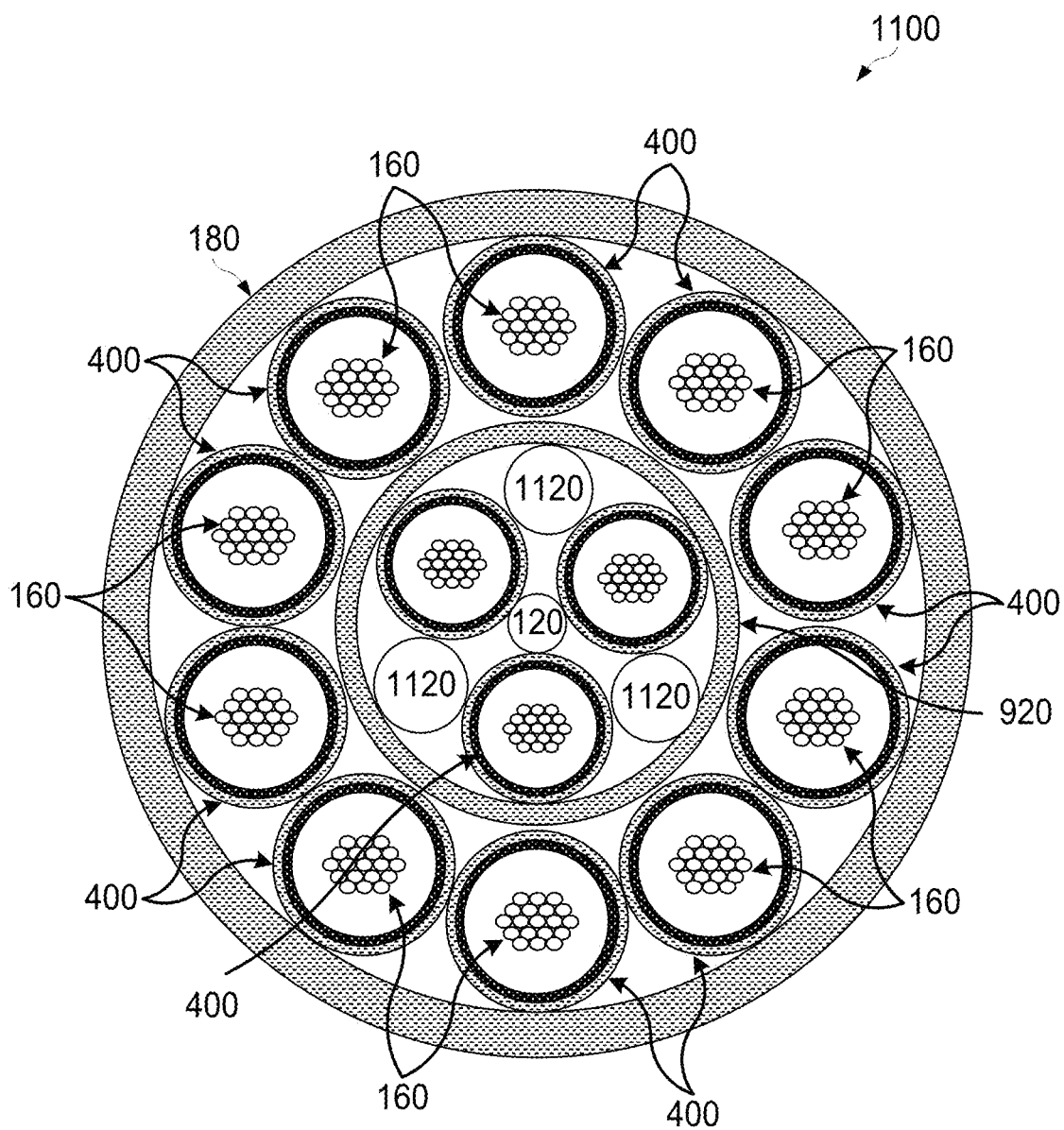
Figure 11B:
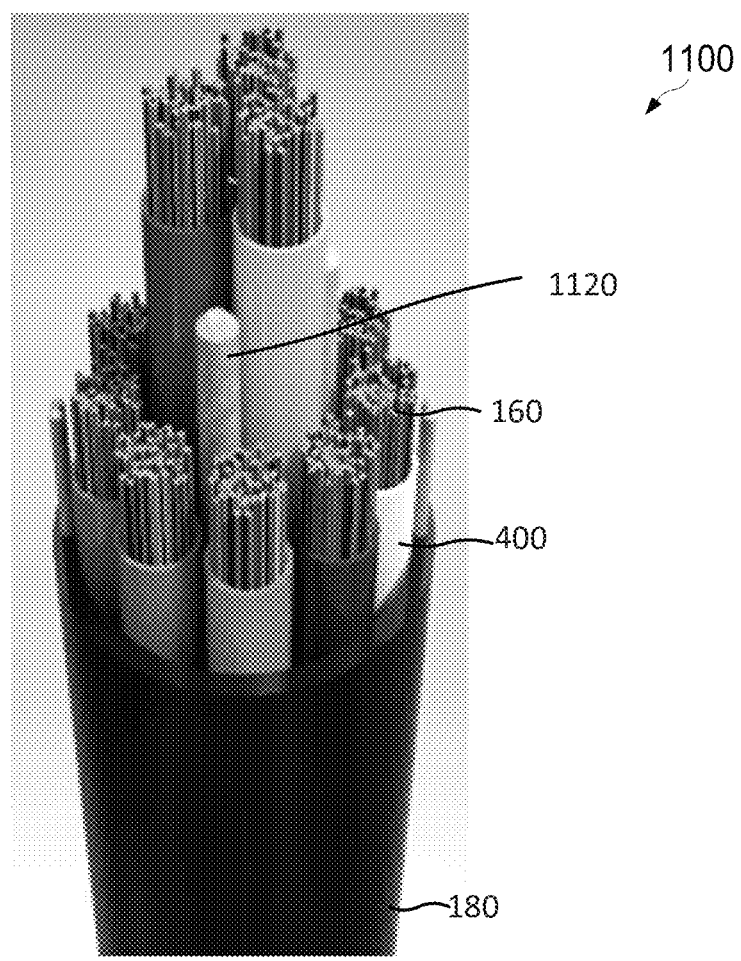

FIGS. 11A-B illustrate a specific design for an optical cable 1100 in accordance with an alternative embodiment of the invention, wherein FIG. 11A illustrates a cross-sectional view of the optical cable 1100 prior to compression and FIG. 11B illustrates a corresponding projection view.

The optical cable 1100 is designed similar to the embodiment of FIGS. 9A-B in that they include an support layer 920 around the central strength member 120 and further include two rows of buffer tubes 400 around the central region. However, in this embodiment, a smaller number of buffer tubes 400 are arranged in the first row. Instead of six buffer tubes arranged in FIGS. 9A-B, in this embodiment three buffer tubes are arranged in the first row.

However, unlike the prior embodiments, this embodiment also includes additional strength members 1120 that are placed around the central strength member 120. The additional strength members 1120 are separated from the central strength member 120 by the buffer tubes 400 in the first row. In one embodiment, the number of the additional strength members 1120 is the same as the number of the buffer tubes 400 in the first row. The additional strength members 1120 provide additional rigidity to the optical cable 1100 for supporting a larger number of buffer tubes 400. In particular, the additional strength members 1120 along with the central strength member 120 make better use of space since they are smaller in diameter relative to the buffer tubes 400 by at least a factor of two.

Consequently, in the embodiment of FIGS. 11A-B, three deformable buffer tubes are arranged in a first row and enclosed by a support layer 920. Another ten buffer tubes are arranged around the support layer 920.

An optical cable may be deployed for use in a communication system (e.g., networking or telecommunications). A communication system may include optical cables 600 architecture such as fiber-to-the-node (FITN), fiber-to-the-telecommunications enclosure (FTTE), fiber-to-the-curb (FITC), fiber-to-the-building (FTTB), and fiber-to-the-home (FTTH), as well as long-haul or metro architecture. Moreover, an optical module or a storage box that includes a housing may receive a wound portion of the optical fiber disclosed herein. By way of example, the optical fiber may be wound around a bending radius of less than about 15 millimeters (e.g., 10 millimeters or less, such as about 5 millimeters) in the optical module or the storage box.

Optical cables containing optical fibers as disclosed may be variously deployed, including as drop cables, distribution cables, feeder cables, trunk cables, and stub cables, each of which may have varying operational requirements (e.g., temperature range, crush resistance, UV resistance, and minimum bend radius).

Such optical cables may be installed within ducts, microducts, plenums, or risers. By way of example, an optical cable may be installed in an existing duct or microduct by pulling or blowing (e.g., using compressed air).

In general, to achieve satisfactory long-distance blowing performance (e.g., between about 3,000 to 5,000 feet or more), the outer cable diameter of an optical fiber cable should be no more than about 70 to 80 percent of the duct's or microduct's inner diameter.

Moreover, the optical cables may be directly buried in the ground or, as an aerial cable, suspended from a pole or pylon. An aerial cable may be self-supporting, or secured or lashed to a support (e.g., messenger wire or another cable). Exemplary aerial optical cables include overhead ground wires (OPGW), all-dielectric self-supporting cables (ADSS), all dielectric lash cables (AD-Lash), and figure-eight cables, each of which is well understood by those having ordinary skill in the art. Figure-eight cables and other designs can be directly buried or installed into ducts, and may optionally include a toning element, such as a metallic wire, so that they can be found with a metal detector.

To effectively employ the present optical fibers in a transmission system, connections are required at various points in the network. Optical fiber connections are typically made by fusion splicing, mechanical splicing, or mechanical connectors. During the splicing operation at low temperatures, mitigation of possible freezing of the water of emulsion may be desired. In particular, if normal evaporation and diffusion processes have not led to migration of water out of the buffer tube. In order to depress the freezing point of the water of emulsion, the aqueous portion of the emulsion can be modified to include a freezing point depressant (i.e., antifreeze) to render the freezing point of the emulsion below the desired access temperature. The freezing point depressant may be, for example, such as propylene glycol, methanol (e.g., methyl alcohol, carbinol, wood alcohol, wood naphtha, wood spirits, etc.), ethylene glycol, or glycerol to render the freezing point below the desired access temperature.

The fiber coating system within this cable combined with the fiber lubricant system shall also be a compatible system. As the emulsion lubricant may entrain water into the fiber optic buffer tube, the buffer tube and coated fiber system shall be able to withstand at least a 30 day exposure to 60° C. at a relative humidity of 85° C. and preferentially at least a 120 day exposure at 60° C. and a relative humidity of 85° C. with an attenuation change in the 1300-1310 nm wavelength range of <0.5 dB/km.

By way of example, the present optical fiber may be incorporated into single-fiber drop cables, such as those employed for Multiple Dwelling Unit (MDU) applications. In such deployments, the cable jacketing must exhibit crush resistance, abrasion resistance, puncture resistance, thermal stability, and fire resistance as required by building codes. An exemplary material for such cable jackets is thermally stable, flame-retardant polyurethane (PUR), which mechanically protects the optical fibers yet is sufficiently flexible to facilitate easy MDU installations. Alternatively, a flame-retardant polyolefin or polyvinyl chloride sheath may be used.

In general, a strength member is typically in the form of a rod or braided/helically wound wires or fibers, though other configurations are also possible.

The mating ends of connectors can be installed to the optical fiber ends either in the field (e.g., at the network location) or in a factory prior to installation into the network. The ends of the connectors are mated in the field in order to connect the optical fibers together or connect the optical fibers to the passive or active components. As an example, certain optical fiber cable assemblies (e.g., furcation assemblies) can separate and convey individual optical fibers from a multiple optical fiber cable to connectors in a protective manner.

The deployment of such optical cables may include supplemental equipment, which itself may employ the present optical fiber as previously disclosed. For instance, an amplifier may be included to improve optical signals. Dispersion compensating modules may be installed to reduce the effects of chromatic dispersion and polarization mode dispersion. Splice boxes, pedestals, and distribution frames, which may be protected by an enclosure, may likewise be included. Additional elements include, for example, remote terminal switches, optical network units, optical splitters, and central office switches.

Accordingly, embodiments of the present disclosure provide an apparatus and method for manufacturing of optical cable buffer tubes using an emulsion lubricant. In an embodiment, a controlled amount of emulsion lubricant is applied to the surface of one or more optical fibers. A molten polymeric sheath surrounding a water-swellable material (e.g., swellable-thread) is then extruded around the optical fibers to form a loose buffer tube. After the swellable-thread surrounds the optical fibers, the ions in the swellable-thread absorb the water of the emulsion lubricant, leaving a thin layer of silicone between the outer surface of the bundle of optical fibers and the swellable-thread/polymeric sheath. The remaining silicone layer provides mechanical coupling and reduces stiction and buildup of static charges without the drippage observed in conventional gel-free buffer-tubes.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. An optical cable comprising:
a plurality of buffer tubes, each buffer tube comprising:
a bundle of optical fibers comprising an outer surface area,
a swellable-thread comprising a hydrophilic base material comprising water, and
a layer of silicone comprising water, the layer of silicone contacting at least a part of the outer surface area.

2. The optical cable of claim 1, wherein the swellable-thread is disposed around one or more of the bundle of optical fibers.

3. The optical cable of claim 1, wherein the swellable-thread is interwoven with one or more of the bundle of optical fibers.

4. The optical cable of claim 1, wherein the bundle of optical fibers is disposed around the swellable-thread.

5. The optical cable of claim 1, further comprising:
an outer jacket surrounding the plurality of buffer tubes; and
a central strength member, the plurality of buffer tubes disposed around the central strength member.

6. The optical cable of claim 1, wherein the swellable-thread is a tape, a yarn carrying a water-swellable material, or an ultraviolet cured swellable coating.

7. The optical cable of claim 1, wherein a coating, inking, and emulsion system of the bundle of optical fibers is capable of withstanding a period of at least 90 days of water exposure or humidity conditioning testing at 60 degrees Celsius (° C.) with an increase in attenuation that is less than 0.05 decibel/kilometer (dB/km) at a wavelength of 1550 nanometer (nm).

8. The optical cable of claim 1, wherein a coating, inking, and emulsion system of the bundle of optical fibers is capable of withstanding a period of at least 90 days of water exposure or humidity conditioning testing at 60 degrees Celsius (0 C) with an increase in attenuation that is less than 0.1 decibel/kilometer (dB/km) at a wavelength of 1550 nanometer (nm).

9. A buffer tube comprising:
a bundle of optical fibers comprising an outer surface area,
a swellable-thread comprising a hydrophilic base material comprising water, and
a layer of silicone applied as an emulsion lubricant to the bundle of optical fibers, the layer of silicone contacting at least a part of the outer surface area, the emulsion lubricant comprising silicone, the water, and an emulsifying agent.

10. The buffer tube of claim 9, wherein the swellable-thread comprises water absorbed from the emulsion lubricant to provide the layer of silicone on the outer surface area of the bundle of optical fibers.

11. The buffer tube of claim 9, wherein the layer of silicone comprises a silicone region having a thickness between about 0.5 nanometers (nm) and 5 nm.

12. The buffer tube of claim 9, wherein the swellable-thread is disposed around one or more of the bundle of optical fibers.

13. The buffer tube of claim 9, wherein the swellable-thread is interwoven with one or more of the bundle of optical fibers.

14. The buffer tube of claim 9, wherein the bundle of optical fibers is disposed around the swellable-thread.

15. The buffer tube of claim 9, wherein the swellable-thread is a tape, a yarn carrying a water-swellable material, or an ultraviolet cured swellable coating.

16. The buffer tube of claim 9, wherein the layer of silicone provides mechanical coupling, reduces stiction, and static charge buildup during cable access, cable repair, and splicing.

17. An optical cable comprising:
a central strength member disposed in a central region of the optical cable; and
a buffer tube disposed in a peripheral region of the optical cable, the buffer tube comprising
a swellable-thread comprising a hydrophilic base material comprising water,
a bundle of optical fibers disposed around the swellable-thread, the bundle of optical fibers comprising an outer surface area, and
a layer of silicone applied as an emulsion lubricant to the bundle of optical fibers, the layer of silicone disposed at an inner surface contacting at least a part of the outer surface area of the bundle of optical fibers, the emulsion lubricant comprising silicone, the water, and an emulsifying agent.

18. The optical cable of claim 17, further comprising:
an outer jacket disposed in the peripheral region and surrounding the buffer tube.

19. The optical cable of claim 17, wherein the layer of silicone comprises a silicone region having a thickness between about 0.5 nanometers (nm) and 5 nm.

20. The optical cable of claim 17, wherein the layer of silicone provides mechanical coupling, reduces stiction, and static charge buildup during cable access, cable repair, and splicing.

21. The optical cable of claim 17, wherein the layer of silicone increases lubricity of the bundle of optical fibers.

22. The optical cable of claim 17, wherein a coating, inking, and emulsion system of the bundle of optical fibers is capable of withstanding a period of at least 90 days of water exposure or humidity conditioning testing at 60 degrees Celsius (0 C) with an increase in attenuation that is less than 0.05 decibel/kilometer (dB/km) at a wavelength of 1550 nanometer (nm).

23. The optical cable of claim 17, wherein a coating, inking, and emulsion system of the bundle of optical fibers is capable of withstanding a period of at least 90 days of water exposure or humidity conditioning testing at 60 degrees Celsius (0 C) with an increase in attenuation that is less than 0.1 decibel/kilometer (dB/km) at a wavelength of 1550 nanometer (nm).

24. The optical cable of claim 17, wherein the swellable-thread comprises water absorbed from the emulsion lubricant to provide the layer of silicone on the outer surface area of the bundle of optical fibers.

* * * * *